US010768072B2

(12) United States Patent
Bechhoefer et al.

(10) Patent No.: US 10,768,072 B2
(45) Date of Patent: Sep. 8, 2020

(54) DATA ACQUISITION SYSTEM FOR CONDITION-BASED MAINTENANCE

(71) Applicant: Simmonds Precision Products, Inc., Vergennes, VT (US)

(72) Inventors: Eric R. Bechhoefer, New Haven, VT (US); John T. Taylor, Shelburne, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 104 days.

(21) Appl. No.: 15/858,627

(22) Filed: Dec. 29, 2017

(65) Prior Publication Data

US 2018/0120200 A1    May 3, 2018

Related U.S. Application Data

(63) Continuation of application No. 15/132,477, filed on Apr. 19, 2016, now Pat. No. 9,897,516, which is a
(Continued)

(51) Int. Cl.
*G01M 13/00* (2019.01)
*F03D 17/00* (2016.01)
(Continued)

(52) U.S. Cl.
CPC ............ *G01M 13/00* (2013.01); *F03D 7/047* (2013.01); *F03D 17/00* (2016.05);
(Continued)

(58) Field of Classification Search
CPC .. F03D 11/0091; F03D 7/047; F05B 2240/96; F05B 2270/326; F05B 2270/332;
(Continued)

(56) References Cited

U.S. PATENT DOCUMENTS 7,013,203 B2   3/2006  Moore et al.
7,127,373 B2  10/2006  House et al.
(Continued)

FOREIGN PATENT DOCUMENTS

CN    1991652 A    7/2007
CN  101542519 A    9/2009
(Continued)

OTHER PUBLICATIONS

Bechhoefer, "A State-Space Model for Vibration Based Prognostics", PHM Conference, 2010.
(Continued)

*Primary Examiner* — John H Le
(74) *Attorney, Agent, or Firm* — Kinney & Lange, P.A.

(57) ABSTRACT

Generally, a system and method consistent with the present disclosure may provide a relatively low cost, relatively robust data acquisition and analysis system useful for condition-based maintenance. The system may be useful for condition-based maintenance in industrial applications, e.g., of equipment and/or machinery. The industrial monitoring system may be used, for example, to monitor a condition of rotating machinery, e.g., a wind turbine. The system and method may include data analysis that may be useful for anticipating a need for maintenance, repair and/or replacement of one or more components.

15 Claims, 19 Drawing Sheets

Related U.S. Application Data continuation of application No. 13/892,784, filed on May 13, 2013, now abandoned, which is a continuation of application No. 13/301,735, filed on Nov. 21, 2011, now Pat. No. 8,442,778, which is a continuation of application No. 12/947,415, filed on Nov. 16, 2010, now Pat. No. 8,082,115.

(60) Provisional application No. 61/261,473, filed on Nov. 16, 2009.

(51) Int. Cl.
  *F03D 7/04* (2006.01)
  *G05B 23/02* (2006.01)

(52) U.S. Cl.
  CPC ...... *G05B 23/0283* (2013.01); *F05B 2240/96* (2013.01); *F05B 2270/326* (2013.01); *F05B 2270/332* (2013.01); *F05B 2270/803* (2013.01); *Y02E 10/723* (2013.01); *Y02P 80/22* (2015.11)

(58) Field of Classification Search
  CPC .............. F05B 2270/803; G01M 13/00; G05B 23/0283; Y02E 10/722; Y02E 10/723
  USPC ............ 702/34, 113, 182, 188, 189; 73/168; 290/44, 55; 416/37, 40; 700/286, 291, 700/297; 714/4.4
  See application file for complete search history.

(56) References Cited

U.S. PATENT DOCUMENTS

| | | | |
|---|---|---|---|
| 7,322,794 | B2 | 1/2008 | LeMieux et al. |
| 7,677,869 | B2 | 3/2010 | Martinez De Lizarduy Romo et al. |
| 7,684,936 | B2 | 3/2010 | Bechhoefer |
| 8,082,115 | B2 * | 12/2011 | Bechhoefer .............. F03D 7/047 702/34 |
| 8,255,187 | B2 | 8/2012 | Ooba et al. |
| 8,442,778 | B2 * | 5/2013 | Bechhoefer .............. F03D 7/047 702/34 |
| 9,897,516 | B2 * | 2/2018 | Bechhoefer .............. F03D 7/047 |
| 2002/0029097 | A1 | 3/2002 | Pionzio, Jr. et al. |
| 2004/0230377 | A1 | 11/2004 | Ghosh et al. |
| 2005/0143957 | A1 | 6/2005 | Kauppila et al. |
| 2006/0070435 | A1 | 4/2006 | LeMieux et al. |
| 2007/0101178 | A1 | 5/2007 | Jammu et al. |
| 2007/0198870 | A1 | 8/2007 | Cheng et al. |
| 2009/0019319 | A1 | 1/2009 | Ooba et al. |
| 2009/0160189 | A1 | 6/2009 | Rasmussen |
| 2009/0210200 | A1 | 8/2009 | Kunft et al. |
| 2009/0254224 | A1 * | 10/2009 | Rasmussen ............ G05B 15/02 700/287 |
| 2010/0096854 | A1 | 4/2010 | Paluszek et al. |
| 2010/0138182 | A1 | 6/2010 | Jammu et al. |
| 2010/0280797 | A1 | 11/2010 | Erichsen |
| 2011/0020122 | A1 | 1/2011 | Parthasarathy et al. |
| 2011/0135465 | A1 | 6/2011 | Braicks |

FOREIGN PATENT DOCUMENTS

| | | |
|---|---|---|
| EP | 1930855 A2 | 6/2008 |
| WO | WO2009133161 A2 | 11/2009 |

OTHER PUBLICATIONS

Orchard, et al. "A Particle Diltering Approach for On-line Failure Prognosis in a Planetary Carrier Plate", International Journal of Fuzzy Logic and Intelligent Systems, vol. 7, No. 4, Dec. 2007.
Bechhoefer, "Use of Paris Law for Prediction of Component Remaining Life", IEEE Aerospace Conference, Feb. 2008.
Arulampalam, et al. "A Tutorial on Particle Filters for Online Nonlinear/Non-Gaussian Bayesian Tracking," IEEE Transactions on Signal Processing, vol. 50, No. 2, Feb. 2002.
Bechhoefer, "Bearing Envelope Analysis Window Selection", PHM Conference, 2009.
Ganeriawala, "Some Observation of the Detection of Rilling Element Bearing Outer Race Faults," SpectraQuest, www.spectraquest. com, Sep. 2006.
Zakrajsek, "Detecting Gear Tooth Fracture in a High Contact Ration Face Gear Mesh", NASA ARL-TR-600, 1995.
Wemhoff et al., "Gearbox Diagnostics Development Using Dynamic Modeling" American Helicopter Society Annual Forum, 2007.
Wheitner et al., "Investigation of the Effects of Manufacturing Variation and Materials on Fatigue Crack Detection Methods in Gear Teeth" CASA-CR-195093, 1994.
Van Der Merwe, et al., "The Square-Root Unscented Kalman Filter for State and Parameter-Estimation," Conferece on Acounstics, Speech, and Signal Processing, 2001. Proceedings. (ICASSP '01). 2001 IEEE International.
Vecer et al., "Condition Indicators for Gearbox Condition Monitoring Systems", Acta Polytechnica vol. 45., No. 6/2005.
Bechhoefer, et al., "A Review of Time Synchronous Average Algorithms" PHM conference, 2009.
Decker et al., "Comparison of Interpolation Methods as Applied to Time Synchronous Averaging" ARL-TR-1960, MFPT, Apr. 19-22, 1999.
Zakrajsek, "An Investigation of Gear Mesh Failure Prediction Techniques," National Aeronautics and Space Administration Cleveland OH Lewis Research Center, Report Date: Oct. 1989.
McFadden, "Window Functions for the Calculation of the Time Domain Averages of the Vibration of the Individual Planet Gears and Sun Gear in Epicyclic Gearbox," Journal of Vibration and Acoustics, Apr. 1994, Col. 116/179.
McFadden, et al., "A signal processing technique for detecting local defects in a gear from the signal average of the vibration," Proc Instn Mech Engrs vol. 199 No. C4, 1985.
McFadden, et al., "A technique for calculating the time domain averages of the vibration of the individual planet gears and the sun gear in an epicyclic gearbox," Journal of Sound and Vibration (1991) 144(1), 163-172.
Boskoski, et al., "Bearing fault detection with application to PHM Data Challenge," International Journal of Prognostics and Health Management, 2009 PMH Conference.
Bechhoefer, "A Method for Generalized Prognostics of a Component Using Paris Law," available at www.vtol.org/f64_bestPapers/ hums.pdf, retrieved on Feb. 10, 2011.
Byington, et al., "Metrics Evaluation and Tool Development for Health and Usage Monitoring System Technology," HUMS 2003 Conference, pp. 35-43.
Byington et al., "Verification and validation of diagnostic/ prognostic algorithms," 2005 MFPT Proceedings (10 pages).
Numerical Recopies in C: The Art of Scientific Computing, "Chapter 12. Fast Fourier Transform" 1988-1992 by Combridge University Press. pp. 504-521. (sections 12.2-12.3).
Bechhoefer, et al., "Mechanical Diagnostics System Engineering in IMD HUMS," Aerospace Conference, 2006 IEEE (9 pages).
Bechhoefer, et al., "Use of Non-Gaussian Distribution for Analysis of Shaft Components," Aerospace Conference, 2006 IEEE (10 pages).
Bechhoefer, et al., "A Generalized Process for Optimal Threshold Setting in HUMS," Aerospace Conference, 2007 IEEE (9 pages).
Mechefske, et al., "Fault Detection and Diagnosis in Low Speed Rolling Element Bearings Using Inductive Inference Classifcation," Mechanical Systems and Signal Processing, (1995) 9(3), 275-286.
Extended European Search Report dated Mar. 26, 2013 by European Patent Office in corresponding European Patent Application No. 10 830 907.1.
International Search Report and Written Opinion dated Jan. 18, 2010 issued in related International Patent Application No. PCT/ US2010/056850.
Chinese Office Action dated Sep. 14, 2015 in corresponding Chinese Application Serial No. 201080059527.1.

(56) References Cited

OTHER PUBLICATIONS

European Communication dated Mar. 26, 2013 in corresponding European Patent Application No. 10830907.1.
Chinese Office Action dated Mar. 3, 2014 in corresponding Chinese Patent Application No. 201080059527.1.
European Communication dated Mar. 25, 2014 in corresponding European Patent Application No. 10830907.1.
European Communication dated May 29, 2015 in corresponding European Patent Application No. 10830907.1.
Chinese Office Action dated Jan. 6, 2015 in corresponding Chinese Patent Application No. 201080059527.1.
Indian Office Action for India Patent Application 4300/DELNP/2012, dated Nov. 20, 2018, 8 pages.

* cited by examiner

DATA ACQUISITION SYSTEM FOR CONDITION-BASED MAINTENANCE

CROSS REFERENCE TO RELATED APPLICATIONS

This application is a continuation of co-pending U.S. patent application Ser. No. 15/132,447 filed Apr. 19, 2016, which is a continuation of U.S. patent application Ser. No. 13/892,784, filed May 13, 2013, which is a continuation of U.S. patent application Ser. No. 13/301,735, filed Nov. 21, 2011, now U.S. Pat. No. 8,442,778, which is a continuation of U.S. patent application Ser. No. 12/947,415, filed Nov. 16, 2010, now U.S. Pat. No. 8,082,115, which claims the benefit of U.S. provisional patent application Ser. No. 61/261,473, filed Nov. 16, 2009, the entire disclosures of which are incorporated herein by reference.

TECHNICAL FIELD

The present disclosure relates to a system and method for acquiring data for condition-based maintenance.

BACKGROUND

Useful life of a machine and/or equipment may be extended by performing preventive maintenance. In some situations, preventive maintenance may be performed on a set schedule, for example, time elapsed and/or operating hours for a machine and/or piece of equipment. Such a set schedule may result in replacing some parts before it is necessary. Delays in scheduled maintenance may result in equipment failure which may be catastrophic, depending on the failure mode. In order to anticipate a failure of a component and/or a machine, it may be desirable to monitor one or more conditions related to the machine and/or component. Based on this monitoring, maintenance may be performed more efficiently, for example, to avoid replacing components that are sound and/or to replace components prior to failure.

In some situations (e.g., wind farm), the machine (e.g., wind turbine) may be exposed to hostile environmental conditions, e.g., rain, snow and/or temperature extremes. A monitoring device located on or near the machine may likewise be exposed to the hostile environmental conditions. Although electrical and/or electronic hardware may exist that is designed to withstand such conditions, such hardware may add significant cost. It may therefore be desirable to provide a relatively low cost and robust equipment monitoring system.

BRIEF DESCRIPTION OF THE DRAWINGS

These and other features and advantages will be better understood by reading the following detailed description, taken together with the drawings wherein.

DETAILED DESCRIPTION

Generally, a system and method consistent with the present disclosure may provide a relatively low cost, relatively robust data acquisition and analysis system useful for condition-based maintenance. The system may be useful for condition-based maintenance in industrial applications, e.g., of equipment and/or machinery. The industrial monitoring system may be used, for example, to monitor a condition of rotating machinery, e.g., a wind turbine. Other examples of machines and/or equipment that may be monitored using the industrial monitoring system include, but are not limited to, gas turbines and/or gearboxes associated with ground vehicles, ships and/or aircraft (e.g., helicopters). The system may be used for generalized industrial monitoring.

The system and method may include data analysis that may be useful for anticipating a need for maintenance, repair and/or replacement of one or more components. One or more parameters associated with a condition of a component may be detected. Based, at least in part on the sensed parameter(s), the condition of the component may be determined. For example, using vibration and/or usage data, the condition of a component, e.g., a shaft, gear and/or bearing may be determined. Based on the condition of the component, a remaining useful life ("RUL") may then be determined. Statistical data and/or physical limits may be used to determine a current equipment state. The remaining useful life may be determined using, e.g., physics of failure models and/or usage and/or statistical data.

Figure 1A:
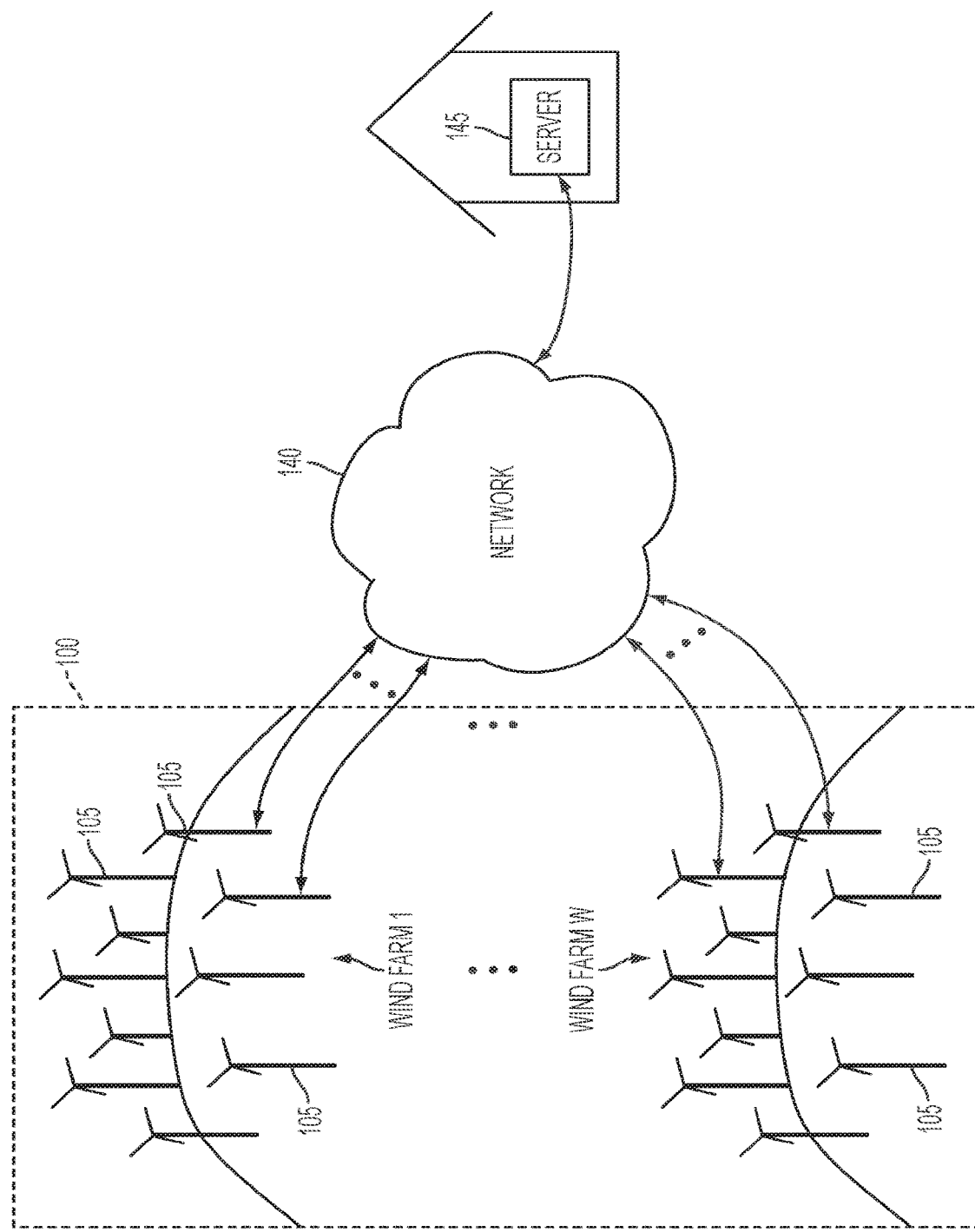
FIG. 1A is a sketch of an exemplary wind farm that may benefit from condition-based maintenance, consistent with the present disclosure.

FIG. 1A is a sketch of an exemplary wind farm 100 that may benefit from condition-based maintenance, consistent with the present disclosure. The wind farm 100 includes a number of tower mounted wind turbines (e.g., wind turbine-tower assembly 105) configured to convert wind energy into electrical energy.

Figure 1C:
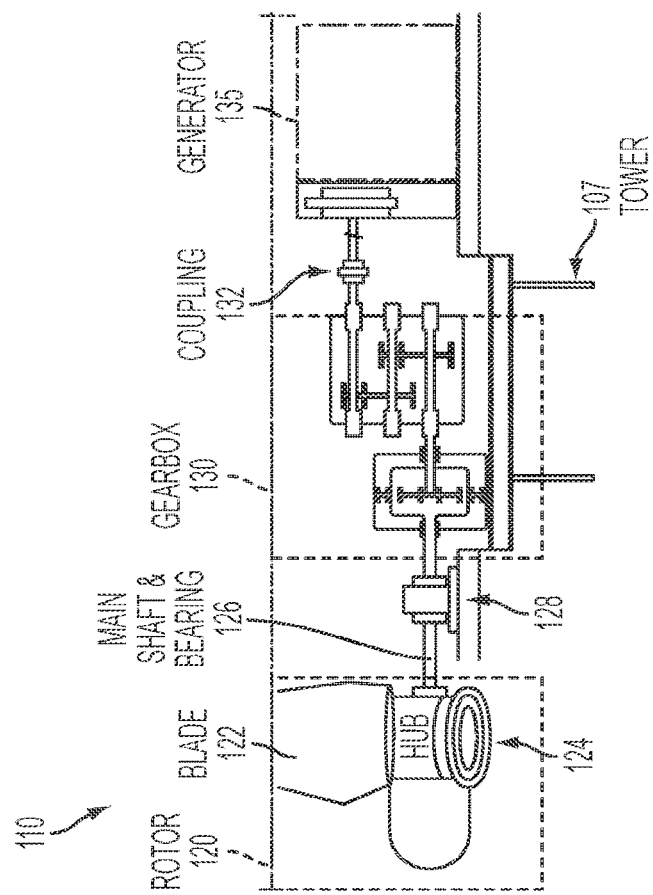
FIG. 1C is an example of a wind turbine of the wind turbine-tower assembly of FIG. 1B.
Figure 1B:
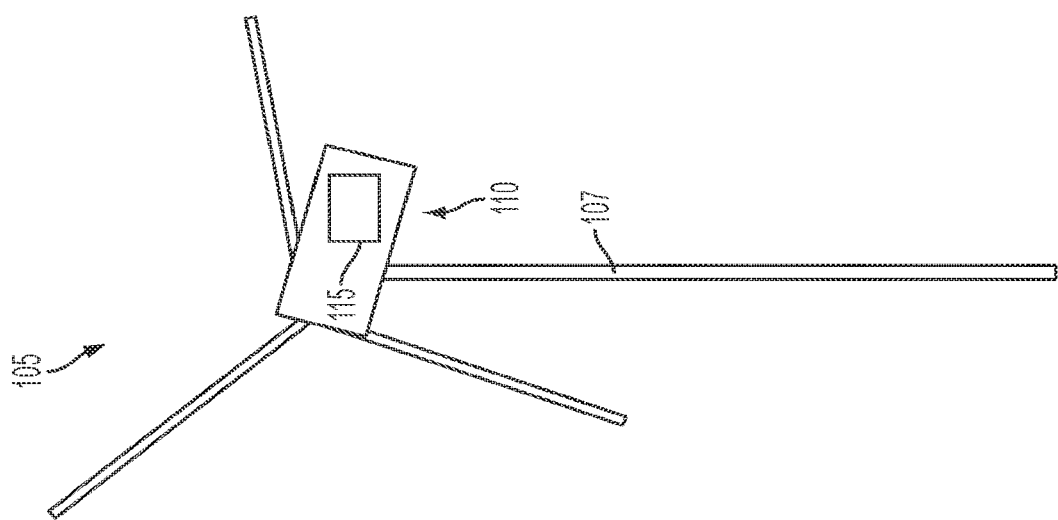
FIG. 1B is a sketch of a wind turbine-tower assembly of the wind farm of FIG. 1A.

FIG. 1B is a sketch of a wind turbine-tower assembly 105. The wind turbine-tower assembly 105 includes a tower 107 and a wind turbine 110 mounted on the tower 107. A data acquisition subsystem 115, consistent with the present disclosure, may be mounted in and/or on the wind turbine 110 and/or tower 107. Turning again to FIG. 1A, the data acquisition subsystem 115 may be coupled to a remote server 145 via e.g., a network 140. The server 145 may be housed in a controlled environment and may be accessible to a user for monitoring a condition of the wind turbines 105, as described herein.

FIG. 1C is an example of a wind turbine, e.g., wind turbine 110. Each wind turbine 110 includes a rotor 120, a gearbox 130 and an electrical generator 135. The rotor 120 is coupled to the electrical generator 135 via the gearbox 130. The rotor 120 includes a plurality of blades 122 coupled to a hub 124 coupled to a main shaft 126. The main shaft 126 may pass through a bearing (e.g., main bearing 128) and is coupled to the gearbox 130. The gearbox 130 may include a plurality of gears and associated bearings. The gearbox 130 may be coupled to the electrical generator 135 via a coupling 132.

Wind farms may be located in remote areas where wind often blows, e.g., on or near mountain tops and/or hilltops and/or in an ocean and/or other body of water. In addition to a cost of performing maintenance and/or repair, a cost associated with accessing a wind turbine for the maintenance and/or repair may be significant. Allowing a component, e.g., a gear, shaft and/or bearing to fail may result in catastrophic damage to the wind turbine and a relatively greater cost to repair. It may therefore be desirable to anticipate a need for maintenance and/or repair in order to plan for the costs and/or to prevent a catastrophic failure. Replacing a component "early", i.e., while good, may unnecessarily contribute cost to maintaining the wind farm. Accordingly, it may be desirable to predict a remaining useful life of a component so that replacement may be scheduled when the component is no longer good but prior to a catastrophic failure. Such prediction may be based, at least in part, on detecting when the component is no longer good but not yet bad.

Exemplary System Architecture

Figure 2:
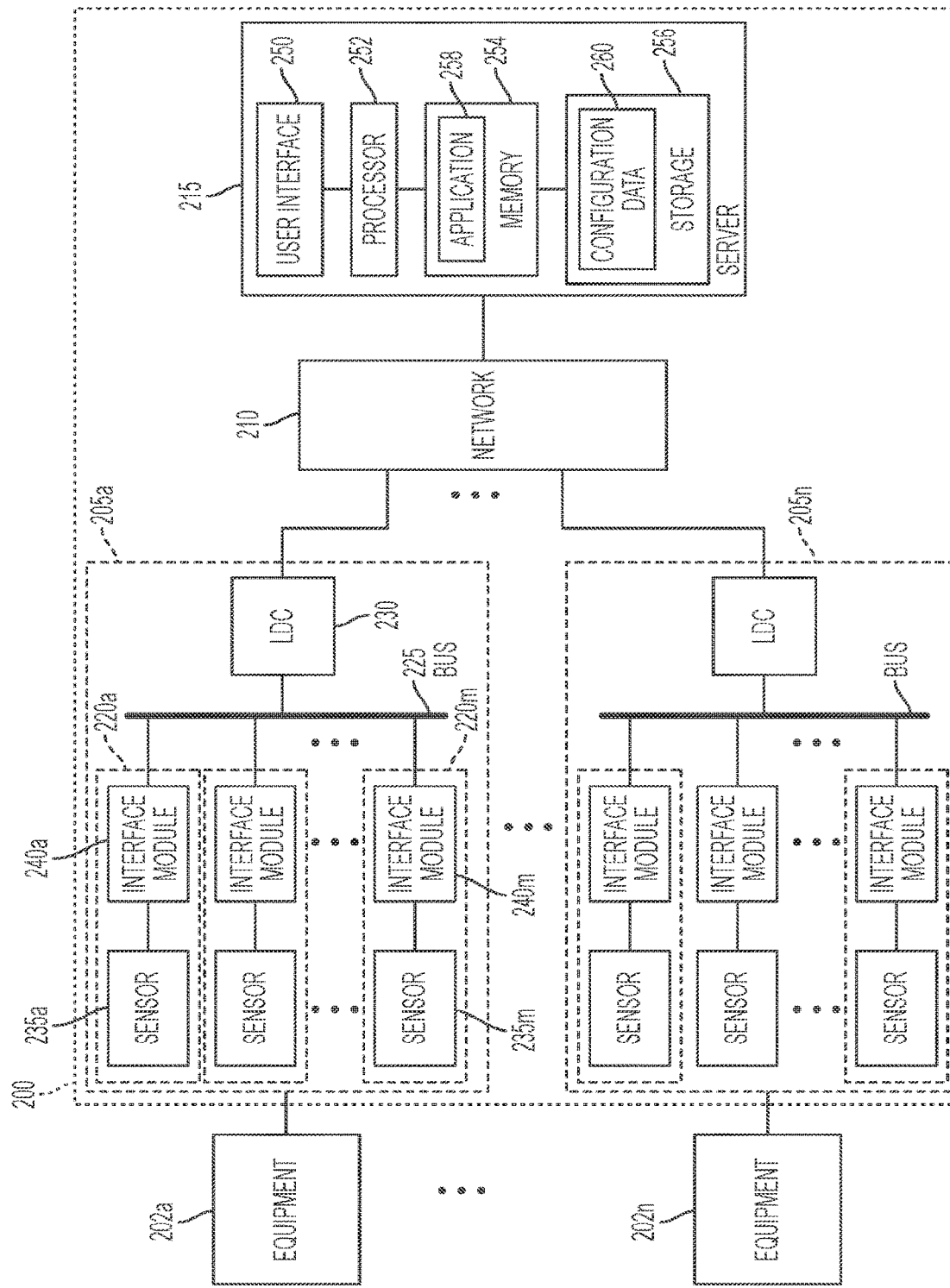
FIG. 2 is a functional block diagram of an exemplary industrial monitoring system consistent with the present disclosure.

FIG. 2 is a functional block diagram of an exemplary industrial monitoring system 200 consistent with the present disclosure. The system 200 may include one or more data acquisition subsystems 205a, . . . , 205n (generically subsystem 205) coupled to a base station, e.g., server 215. The subsystems 205a, . . . , 205n may be coupled to the server 215 via a network 215 that may include wired and/or wireless links. For example, the network 215 may utilize an Ethernet protocol. The Ethernet protocol may comply or be compatible with the Ethernet standard published by the Institute of Electrical and Electronics Engineers (IEEE) titled "IEEE 802.3 Standard", published in March, 2002 and/or later versions of this standard. The server 215 may be located a distance from the equipment site, e.g., in a controlled environment.

Each data acquisition subsystem 205a, . . . , 205n may be associated with a respective machine, e.g., equipment 202a, . . . , 202n, and may be located at an equipment site, relatively near the equipment being monitored (i.e., equipment 202a, . . . , 202n). Equipment being monitored may include, but is not limited to, gas turbines, gearboxes associated with ground vehicles (e.g., trucks and/or trains), ships, aircraft and/or general industrial equipment. For example, each wind turbine 105 in wind farm 100 may have an associated data acquisition subsystem 205a, . . . , or 205n (corresponding to data acquisition subsystem 115 of FIG. 1B). Each subsystem 205a, . . . , 205n may then be located at or near a top of a respective tower that supports the respective wind turbine and/or in and/or on the wind turbine itself. Accordingly, the subsystems 205a, . . . , 205n may be configured for operation in potentially harsh environments.

The server 215 may include a user interface 250, a processor 252, memory 254 and/or storage 256. The server 215 is configured to communicate with the data acquisition subsystems 205a, . . . , 205n over network 210. The server 215 may be configured to provide a user access to the subsystems 205a, . . . , 205n. For example, the server 215 may be configured to display data and/or information related to a status of equipment and/or machine being monitored using user interface 250. The server 215 may be configured to provide an estimate of remaining useful life, as described herein.

The user interface 250 may include a graphical user interface (GUI) configured to facilitate access to the data and/or information. The GUI may be configured to provide graphical illustrations of acquired data and/or analysis results to a user. The memory 254 may be configured to store and the processor 252 may be configured to run an application program 250 configured for acquiring, analyzing and/or displaying sensor and/or machine and/or equipment status data. The memory 254 and/or storage 256 may be configured to store configuration data, sensor data and/or machine and/or equipment-related data, as described herein.

For example, the user interface may allow a user to view a status of equipment monitored by a listed data acquisition subsystem 205a (e.g., at an equipment site), view the health/status of the monitored equipment and/or the data acquisition subsystem, interact and view individual components monitored by the data acquisition subsystem, and command/update status of a site. For example, a data acquisition subsystem may be installed on a wind turbine, configured to monitor the health of the wind turbine. The user interface 250 may display overall health and/or a status of an individual component monitored on the wind turbine. Configuration data 260 may be utilized to map command, data and responses to the monitored wind turbine.

Each data acquisition subsystem 205a, . . . , 205n may include one or more sensor modules 220a, . . . , 220m (generically sensor module 220) coupled to a local data concentrator ("LDC") 230 by a bus 225. The bus 225 may be configured to provide serial communication between the sensor modules 220a, . . . , 220m and the associated LDC 230. The bus structure is configured to facilitate scalability, e.g., adding and/or removing one or more sensor module(s) to/from a subsystem. For example, the bus 225 may be configured as a daisy chain.

The bus structure is further configured to reduce wiring between the LDC 230 and the sensor modules 220a, ..., 220m. For example, in a daisy chain bus structure, the LDC 230 may be connected to a first sensor module, e.g., sensor module 220a, by a first link in the bus, the first sensor module may be connected to a second sensor module, e.g., sensor module 220b by a second link in the bus, and so on until a last sensor module is connected to a next to last sensor module by a last link in the bus. The bus may then be terminated by, e.g., a resistor, as described herein. Accordingly, each sensor module may include connectors for connecting to at most two links in the bus.

For example, the bus 225 may be a 4-wire bus or a 2-wire bus. The 4-wire bus may include two wires for communication between each sensor module 220a, ..., 220m and the associated LDC 230 and two wires for providing power and/or ground from the LDC 230 to the sensor modules 220a, ..., 220m. The two-wire bus may be configured for data (communication) over power, i.e., may provide communication between each sensor module 220a, ..., 220m and the associated LDC 230 and power and/or ground from the LDC 230 to the sensor modules 220a, ..., 220m using two wires. For example, for communication, the two wires may be configured according to RS-485, in half-duplex mode. RS-485 (also known as EIA-485 or TIA/EIA-485) is a standard published by ANSI Telecommunications Industry Association/Electronic Industries Alliance that defines electrical characteristics of a driver and receiver for digital communication over a network. The physical media may be two wires configured as a twisted pair. The bus may be configured as linear, multi-drop (i.e., daisy chain) and may be terminated by resistors across the two wires (for reduced noise sensitivity and reduced reflections from the wire ends that may corrupt data).

For example, for the two-wire bus, data may be communicated using Manchester encoding (also known as phase encoding). In Manchester encoding each data bit has two transitions and occupies one time period, e.g., one clock cycle. For example, for a high or 1 bit, the transition may be from +1.65 volts to −1.65 volts and for a low or 0 bit, the transition may be from −1.65 volts to +1.65 volts. A transition according to the data bit occurs at a midpoint of the clock cycle. A transition may occur at a start of a clock cycle in order to place the data signal in the appropriate state for the mid-cycle transition. For example, the clock rate may be 7.2 megahertz (MHz) and the bit rate may be 3.6 megabits per second (Mbps).

A Manchester encoded signal has a zero DC component facilitating the data over power two wire configuration. Accordingly, the communication (data) signal may be capacitively or inductively coupled. A filter may be used to separate the communication signal from a DC power supply voltage. For example, the filter may be an analog three pole Chebyshev filter with a 2 Mhz pass band bandwidth. As will be understood by those skilled in the art, other filters may be used to isolate the data signal from the DC power.

In some embodiments, the LDC 230 may be configured to provide a voltage in a range of 20 to 30 Vdc to each associated sensor module 220a, ..., 220m. For example, the LDC 230 may be configured to provide 28 Vdc to the sensor modules, 220a, ..., 220m, if the equipment is in a vehicle. In other words, some vehicles (e.g., trucks, aircraft and trains) may include batteries with a nominal voltage of 28 Vdc. In another example, the LDC 230 may be configured to provide 24 Vdc to the sensor modules 220a, ..., 220m, if the equipment is not in or on a vehicle. In this example, the 24 Vdc may be available from one or more power supplies configured to supply industrial equipment.

Figure 3:
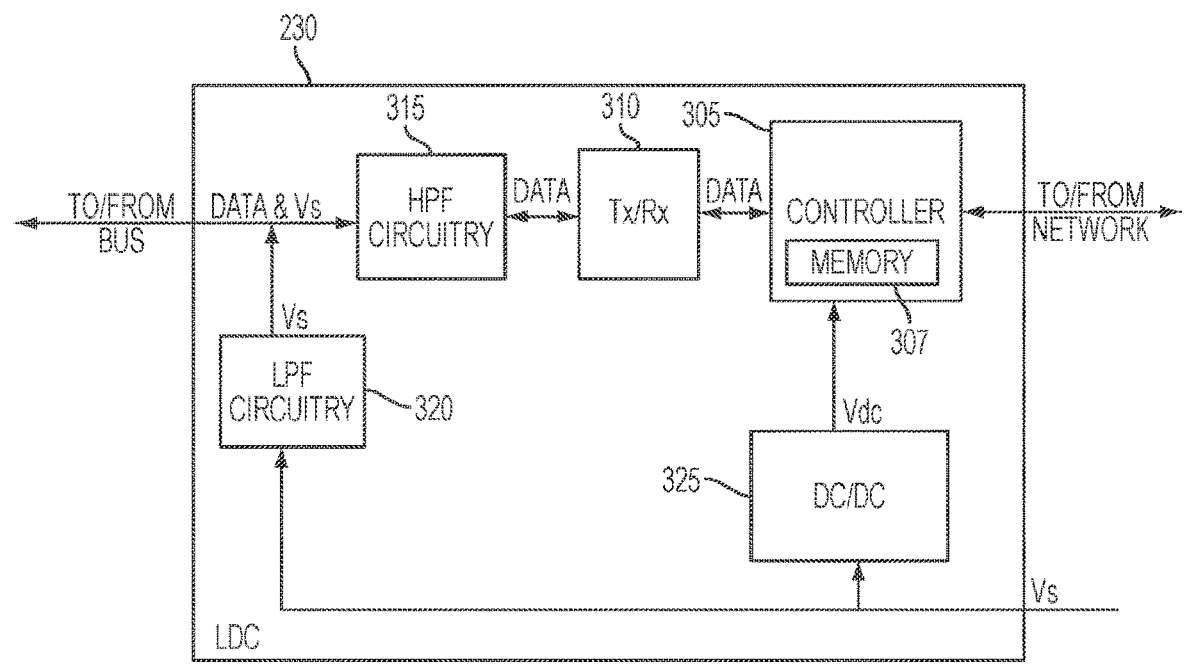
FIG. 3 is a block diagram of an exemplary local data concentrator (LDC) consistent with the present disclosure.

FIG. 3 is a block diagram of an exemplary LDC 230. The LDC 230 is configured to be coupled to each sensor module 220a, ..., 220m via bus 225. The LDC 230 is configured to receive a supply voltage Vs and to provide this supply voltage to the sensor modules 220a, ..., 220m via bus 225. The LDC 230 may include a controller 305, memory 307, a transceiver TxRx 310, high pass filter (HPF) circuitry 315, low pass filter (LPF) circuitry 320 and/or a DC/DC converter 325. The controller 305 may be configured to receive communication (e.g., commands and/or data) from network 210 and data from bus 225. The memory 307 may be configured to store module output data, configuration data, and/or an application. The transceiver Tx/Rx 310 is configured to decode and/or demodulate coded data (e.g., RS-485 protocol) received from bus 225 (e.g., from sensor modules 220a, ..., 220m) and to provide the decoded/demodulated data to the controller 310. The transceiver Tx/Rx 310 is further configured to receive data and/or commands from the controller 305, encode and/or modulate the data and/or commands using, e.g., Manchester coding, and to transmit the encoded data and/or commands onto bus 225, e.g., for transmission to one or more of sensor modules 220a, ..., 220m.

The HPF circuitry 315 and/or LPF circuitry 320 are configured to separate supply voltage, Vs, from encoded and/or coded data and/or commands on a 2-wire bus system. For example, HPF circuitry 315 may include a capacitor configured to block a dc voltage, e.g., Vs, from reaching transceiver Tx/Rx 310 while passing encoded data and/or commands. For example, LPF circuitry 320 may include an inductor configured to pass supply voltage Vs and to block coded data and/or commands (i.e., high frequencies) from reaching a source of Vs. The DC/DC converter 325 is configured to convert the received supply voltage Vs, e.g., 24 volts or 28 volts, to an appropriate input voltage for controller 305, e.g., 3.3 volts or 5 volts.

Each sensor module 220a, ..., 220m may include a respective sensor 235a, ..., 235m coupled to a respective interface module 240a, ..., 240m. Each sensor module 220a, ..., 220m is configured to mounted on or near a respective component to be monitored, e.g., a shaft, bearing and/or gear. Depending on the equipment being monitored, one or more of the sensor modules 220a, ..., 220m may be exposed to relatively harsh environmental conditions. Accordingly, it may be desirable to package each sensor module 220a, ..., 220m to protect the sensor 235 and interface module 240 while allowing good coupling between the sensor and the parameter the sensor is configured to detect. In particular, the packaging should be configured to protect the sensor 235 and/or interface module 240 from, e.g., electrostatic discharge and/or environmental conditions, and to dissipate heat. The packaging should be relatively light weight, relatively inexpensive to manufacture and/or allow multiple mounting options. One example of such packaging is to encapsulate the sensor and/or interface module in a thermally conductive plastic such as COOLPOLY® thermally conductive liquid polymer available from Cool Polymers, Inc., North Kingstown, R.I. COOLPOLY® is configured to have a thermal conductivity that approaches that of steel, a tensile strength similar to a metal while weighing less than half as much as steel. Further, a sensor module enclosure of COOLPOLY® may be manufactured using injection molding, resulting in a manufacturing process that is less expensive than manufacturing a steel enclosure.

Each sensor 235a, . . . , 235m is configured to detect a parameter associated with the equipment being monitored and to provide as output sensor data corresponding to the parameter Sensors may include, but are not limited to accelerometers, tachometers, pressure sensors, temperature sensors, sensors for detecting debris in oil, sensors for detecting oil viscosity, strain sensors, acoustic sensors and/or other sensors known to those skilled in the art. Accelerometers are configured to measure "proper acceleration", i.e., acceleration relative to free fall, of an object. Accelerometers may be used to detect orientation, acceleration, vibration, shock and/or falling of a component. An accelerometer may be used as a structural load sensor. For example, an accelerometer used as a structural load sensor may be relatively low frequency, e.g., 0.4 kHz bandwidth, and may be configured to detect low frequency (e.g., sub-hertz) vibrations, triodes and/or resonance that may be associated with structural damage. Accelerometer technologies may include piezoelectric based accelerometers and microelectromechanical system (MEMS) based accelerometers. For example, a MEMS accelerometer may be an ADXL001 available from Analog Devices, Inc., Norwood, Mass. The ADXL001 has a 0 to 32 kHz bandwidth and is significantly less expensive than a piezoelectric based accelerometer.

Tachometers may be used to detect rotational speed of a rotating component, e.g., a shaft, gear and/or part of a bearing. Tachometer technologies include optical sensor based, hall sensor based, generator (e.g., coil sensor) based and other tachometer technologies known to those skilled in the art. A tachometer is configured to provide an output, e.g., a pulse, at a rate (e.g., pulses per revolution) that corresponds to (e.g., is proportional to) the rotational speed of the rotating component being monitored.

For example, for the wind farm 100, each data acquisition subsystem 115 may include a plurality of accelerometers and one tachometer. The tachometer may be configured to detect, e.g., the rotational speed of the coupling 132. The plurality of accelerometers may be configured to detect vibration in, e.g., the shaft 126, the main bearing 128, one or more gears in the gearbox 130, and/or the coupling 132. The detected vibration data may then be analyzed to determine a condition of the component being monitored, a condition of the wind turbine and/or a remaining useful life of the component and/or the wind turbine, as described herein.

Each interface module 240a, . . . , 240m may be configured to receive sensor data from the associated sensor 235a, . . . , 235m and to generate module output data based at least in part on the received sensor data. The module output data may then represent the condition of the equipment being monitored. The received sensor data may be analog data. The interface modules 240a, . . . , 240m may be configured to convert analog sensor data received from a respective sensor into corresponding digital data. In some embodiments, the interface modules 240a, . . . , 240m may be configured to analyze the analog and/or digital sensor data. In these embodiments, the module output data may correspond to the remaining useful life of the equipment and/or component being monitored.

Figure 4A:
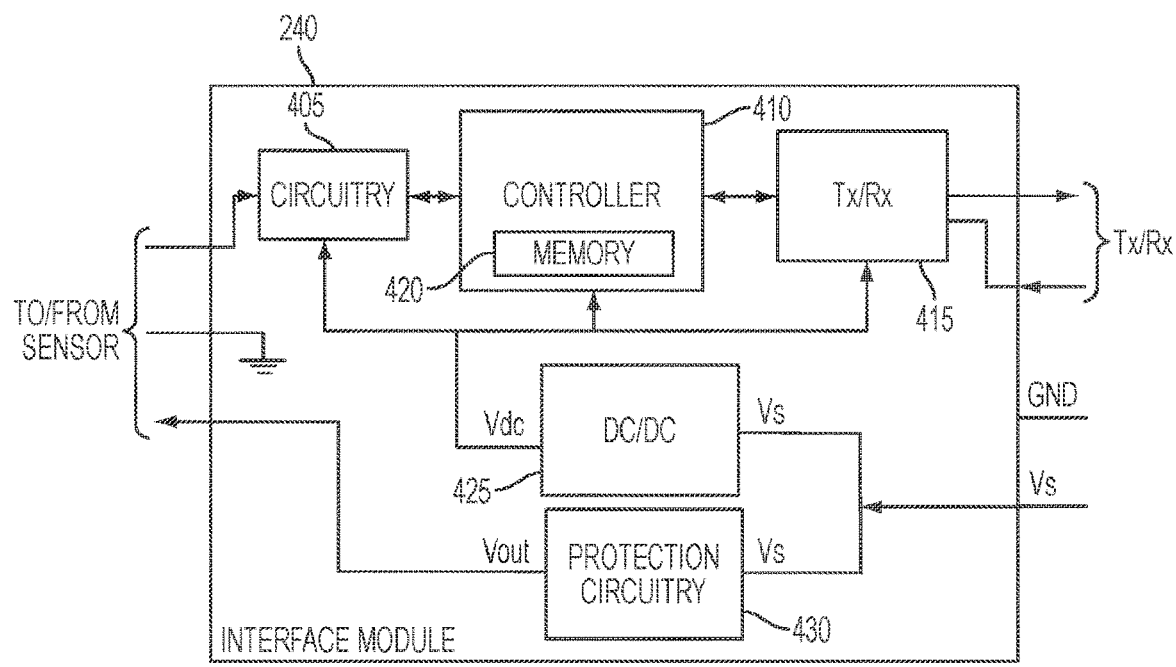
FIG. 4A is a functional block diagram of an exemplary interface module consistent with the present disclosure.
Figure 4B:
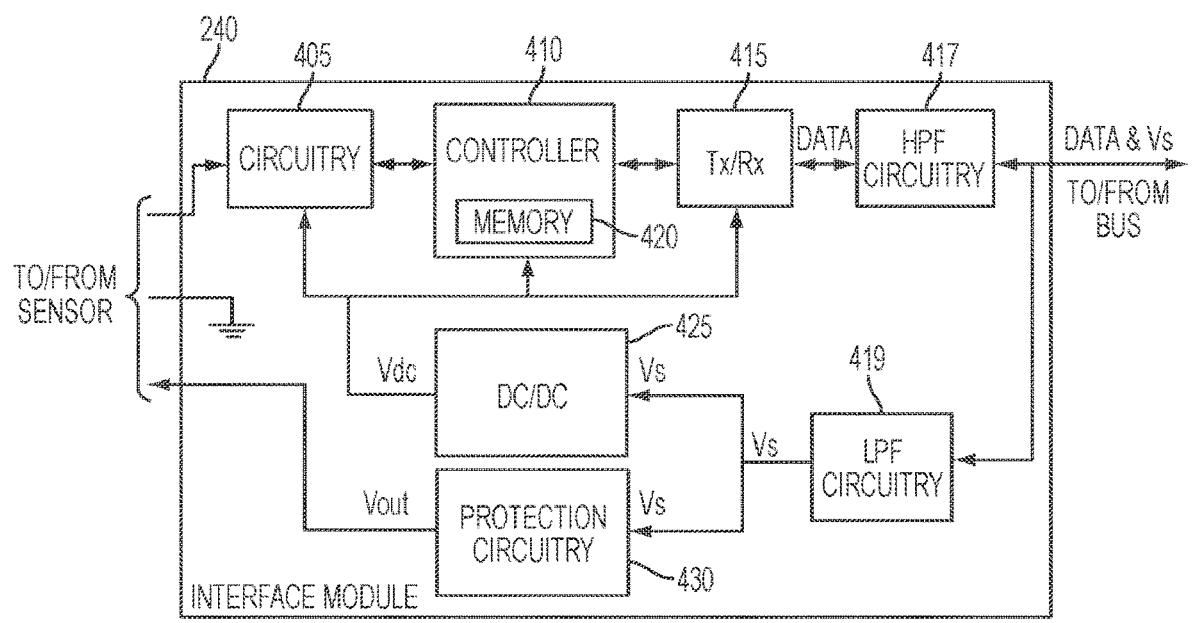
FIG. 4B is a functional block diagram of another exemplary interface module consistent with the present disclosure.

FIG. 4A and FIG. 4B are functional block diagrams of two exemplary interface modules corresponding to interface module 240 of FIG. 2. The interface module 240 may include circuitry 405, a controller 410, a transceiver Tx/Rx 415, a DC/DC converter 425 and/or protection circuitry 430. The interface module 240 may correspond to any interface module in any data acquisition subsystem discussed herein. The interface module 240 may be configured to receive commands from an LDC (e.g., LDC 230) and/or server (e.g., server 215), to acquire and/or receive sensor data (e.g., from a sensor 235), to generate module output data based at least in part on the received sensor data and to transmit the module output data over the bus (e.g., bus 225) to the LDC 230. For example, the interface module 240 may include ports for coupling to the bus 225. In a first example (FIG. 4A), in a 4-wire bus system, as described herein, the interface module 240 may include four ports: two ports for serial communication with the LDC and two ports for receiving power from the LDC 230. In another example (FIG. 4B), in a two-wire bus system, as described herein, the interface module 240 may include two ports for both serial communication with the LDC 230 and for receiving power from the LDC 230. In this example, the interface module 240 may further include HPF circuitry 417 and LPF circuitry 419 configured to separate supply voltage, Vs. from communication (i.e., data and/or commands), as described herein with respect to the LDC 230 (FIG. 3).

The interface module 240 may further include ports for coupling to a sensor. For example, the interface module 240 may include three ports for coupling to a sensor. For example, a first port may be a common ground, a second port may be configured for providing a supply voltage and/or current to a sensor and/or receiving a sensed current and/or a third port may be configured (with the common ground port) for sensing a voltage, e.g., may be a high impedance input. The ports may be surge voltage protected, for example, via a diode to ground.

The circuitry 405 is configured to receive sensor data from an associated sensor 235 and to provide an output based at least in part on the received sensor data. For example, circuitry 405 may include an analog to digital converter ("ADC") configured to convert analog sensor data into digital sensor data for storage, analysis and/or transmission from the interface module 240. For example, circuitry 405 may include the ADC when the associated sensor is an accelerometer, as described herein. For example, the ADC may be. Delta Sigma Analog to Digital converter, such as the Texas Instruments ADS 1241 or ADS 1271, available from Texas Instruments, Inc., Dallas, Tex. The ADS 1241 is a 24 bit, 105 KHz analog to digital converter. Because of the Delta Sigma design, no signal conditioning (e.g. anti-aliasing filter) is needed, allowing changing the sample rate of the ADC with a multi-rate anti-alias filter. The ADC can be commanded to collect at lower data rates, as desired. There is no need for gain control on the system. The 16 most significant bits are used, giving 8 bits for gain (e.g. gain levels of 1, 2, 4, 8, 16, 32, 64, 128 and 256).

In another example, the circuitry 405 may include a comparator configured to detect zero crossings in received sensor data, e.g., when the associated sensor is a tachometer. Circuitry 405 may then be configured to provide an output that changes state (e.g., low to high or high to low) when the sensor output passes through a threshold, e.g., zero. The comparator may be configured as a Schmitt trigger, i.e., including hysteresis, providing two stable states. The input at which the Schmitt trigger changes state may then depend on the output. The output of the circuitry 405 may then be a waveform that transitions from low to high or high to low at or near zero crossings in the sensor output data, i.e., tachometer takeoff. This sensor output data may then be used to determine a rotational speed (e.g., in revolutions per minute RPM) of a rotating component, as described herein.

The controller 410 is configured to receive output data from circuitry 405, the output data based at least in part on the sensor data. If circuitry 405 includes an ADC, e.g., the associated sensor is an accelerometer, digitized sensor data may be provided to the controller 410 from the ADC. The controller 410 may be configured to command the ADC to acquire the sensor data and may then read the ADC output when the acquisition is complete. If the circuitry 405 includes a comparator, e.g., the associated sensor is a tachometer, the output of the comparator may be coupled to a general input/output port of the controller 410. The controller 410 may then be configured to determine a duration from a start of an acquisition to a change of state of the output of the comparator and to store one or more durations in memory. A plurality of durations may be included in a vector of zero-crossings, as described herein. Detecting zero-crossings in hardware, i.e., using a comparator as described herein, may be relatively faster than detecting zero-crossings in software, e.g., by providing tachometer output to an ADC, providing the ADC output to the controller and configuring the controller to determine the zero crossing by analyzing the received ADC output.

For example, the controller may be a microcontroller. For example, the controller 410 may be a PIC 17F type microcontroller available from Microchip Technology, Inc., Chandler, Ariz. In another example, the controller 410 may be an Atmel microcontroller that includes a floating point unit, e.g., an Atmel AT32UC3C0512, available from Atmel Corp., San Jose, Calif. The floating point unit is configured to perform floating point calculations in hardware. Such a floating point unit may provide a speed benefit over floating point operations performed in software. The controller 410 may be configured to receive, analyze, store and/or output data from circuitry 405. The output data is based at least in part on received sensor data and may be digital sensor data. The controller 410 may include memory 420 configured to store digital sensor data and/or the output data based on received sensor data. Although shown as integral to the controller 410, the memory 420 may be external to the controller 410 and may then be coupled to the controller 410. External memory may be dynamic RAM (random access memory) and may be configured to store up to 1 million data points. For example, the external memory may be an MT48H32M16LF 32 megx16 mobile RAM device, available from Micron Technologies, Inc., Boise, Id.

The controller 410 may be coupled to transceiver 415 and may be configured to provide interface module output data to the transceiver 415 for transmission on a bus, e.g., bus 225, to an associated LDC. The controller 410 may be configured to receive digital data and/or commands from the transceiver 415. The transceiver 415 is configured to encode module output data for transmission on bus 225 and to decode commands and/or data received from the LDC via bus 225. For example, received digital data may include a command from, e.g., the associated LDC and/or server 215, to acquire sensor data and/or to transmit received sensor data and/or module output data. The controller 410 may respond to a command from, e.g., an associated LDC, e.g., LDC 230.

The controller 410 may manage the flow of information, e.g., commands and/or data, in and out of the interface module 240. For example, when the associated LDC 230 commands the interface module 240 to acquire data, the controller 410 may activate circuitry 405, clock sensor digital data into memory 420 (e.g., for relatively high speed acquisition) and/or stream data into a transceiver, e.g., transceiver 415. If the controller 410 writes the data to memory 420, at the end of the acquisition, the controller 410 may read memory 420 and send the data to the transceiver 415. For example, the LDC 230 may command an interface module 240 to collect data and may then command the interface module 240 to stream the data back to the LDC 230, where the data may be prepared for transmission to the server 215 via the network 210. For example, the network 210 may be an Ethernet network.

For example, when the sensor 235 is an accelerometer, circuitry 405 may include an ADC, as described herein. Controller 410 may then activate the ADC and clock output of the ADC into memory 420 and/or stream the output of the ADC into transceiver 415. If the output of the ADC is stored in memory 420, the controller 410 may be configured to analyze the stored ADC output data, e.g., in response to a command from the LDC 230.

In another example, when the sensor 235 is a tachometer, circuitry 405 may include a Schmitt trigger whose output is configured to change state based at least in part on the tachometer output, as described herein. In this example, controller 410 may be configured to receive output of the Schmitt trigger, to determine a time between zero crossings and to generate a vector of zero crossing times. The controller 410 may be further configured to determine a rotational speed (RPM) based at least in part on the vector of zero crossing times. The controller 410 may be configured to store the vector of zero crossing times and/or rotational speed in memory 420 and/or to provide the vector of zero crossing times and/or rotational speed to transceiver 415 for output from the interface module 240, e.g., in response to a command from the LDC 230.

For example, the transceiver 415 may be configured for transmitting and receiving serial data using the RS-485 protocol, as discussed herein. For example, the transceiver may be an RS-485 receiver/transmitter, such as Texas instrument SN65HVD21, available from Texas Instruments, Dallas, Tex. The RS-485 protocol may be used in aviation and other relatively harsh electrical environments because it is generally insensitive to electromagnetic interference.

The DC to DC converter 425 may be configured to convert an input voltage, e.g., 24 or 28 Vdc, to a supply voltage compatible with the circuitry 405, controller 410 and/or transceiver 415. For example, the DC to DC 425 converter may convert the input voltage to 5 volts. In another example, the DC To DC converter 425 may convert the input voltage to 3.3 volts. A sensor, e.g., an accelerometer, may be configured to operate using a supply voltage of, for example, 28 Vdc. The DC to DC converter 425 may facilitate provision of a supply voltage, e.g., 28 Vdc, to each interface module 240 over the bus 225, and powering components in the interface module 240 from the input voltage. In other words, one voltage may be input to the interface module 240 and the interface module 240, via the DC/DC converter, may be configured to provide multiple voltages to its components and/or to a sensor.

The protection circuitry 430 is configured to protect a coupled sensor from, e.g., overvoltage and/or overcurrent conditions. For example, the protection circuitry 430 may include a current limit circuit. The current limit circuit may be configured to supply current limited power to a sensor, e.g., an accelerometer.

Data Acquisition

Figure 5:
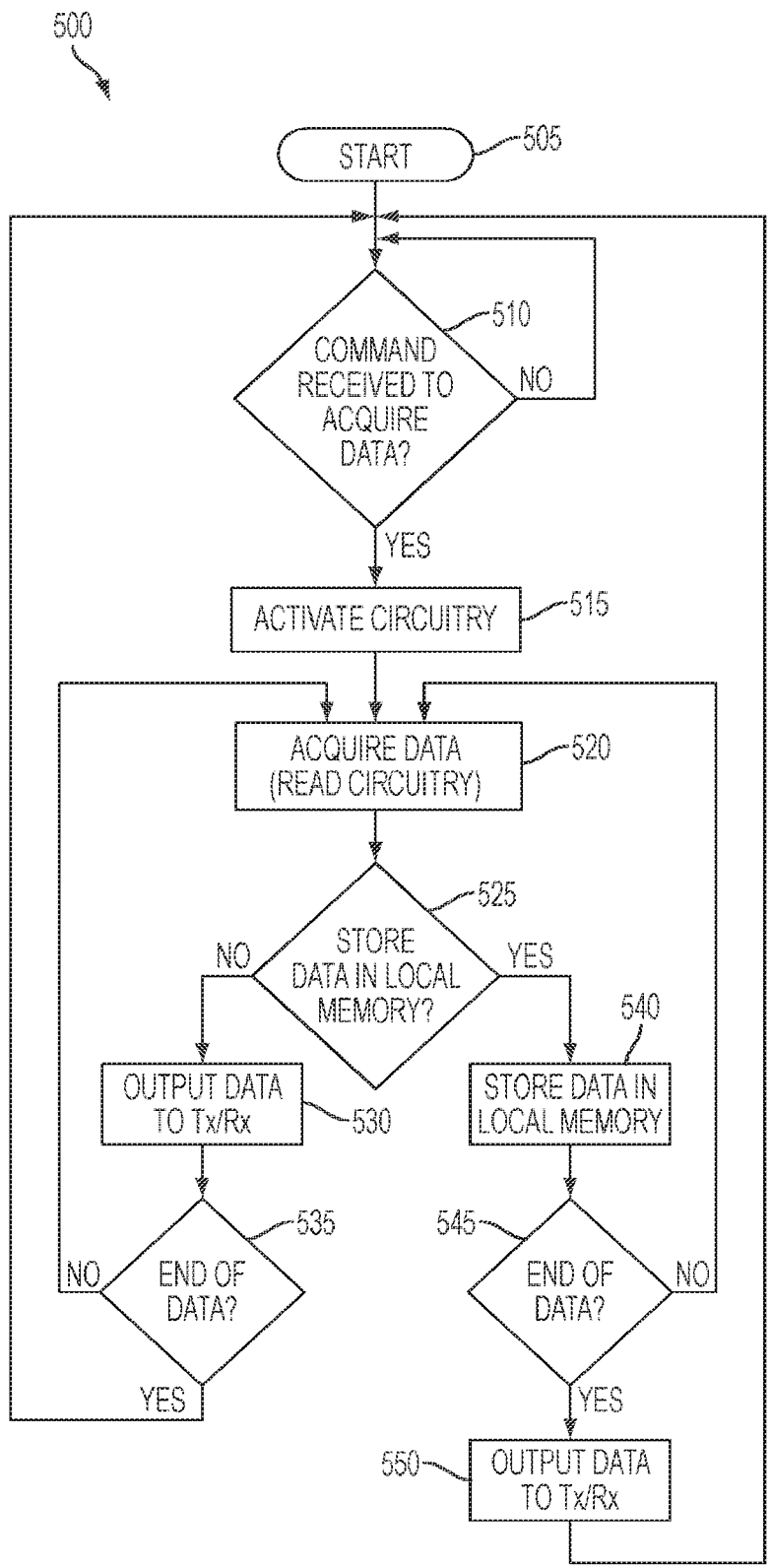
FIG. 5 is an exemplary flow chart for data acquisition using a sensor module consistent with the present disclosure.

FIG. 5 is an exemplary flow chart 500 for data acquisition using a sensor module. Program flow may begin at start 505. Whether a command to acquire data has been received may be determined 510. If the command to acquire data has been received, the circuitry (e.g., circuitry 405) and/or controller (e.g., controller 410) may be activated 515. For example, an ADC may be activated by the controller (e.g., when the sensor is an accelerometer). Data may then be acquired 520 e.g., the controller may read the ADC. In another example, in response to the command to acquire, at operation 520, the controller may detect and/or determine a duration between a start of an acquisition and changes in a state (e.g., changes in voltage levels on an input to the controller). In other words, acquiring data at operation 520 may include zero-crossing detection (e.g., when the sensor is a tachometer), as described herein.

Whether to store the acquired data in local memory may then be determined 525. For example, for a relatively high speed data acquisition, acquired sensor data may be stored in local memory in, for example, the controller 410. For relatively lower speed data acquisition, module output data, e.g., digitized sensor data, may be streamed to the associated LDC. If it is determined not to store data in local memory, data may be output 530 to a transceiver. Whether the end of data has been reached may then be determined 535. If the end of data has not been reached, program flow may return to acquire data 520. If the end of data has been reached, program flow may return to determining 510 whether a command to acquire data has been received. If it is determined to store data in local memory, data may be stored 540 in local memory. Whether the end of data has been reached may then be determined 545. If the end of data has not been reached, program flow may return to acquire data 520. If the end of data has been reached, module output data may be output 550 to the transceiver. Program flow may then return to determining 510 whether a command to acquire data has been received. In this manner, sensor data may be acquired and stored and/or provided to the transceiver.

Turning again to FIG. 2, as described herein, each LDC 230a, . . . , 230n may be configured to couple an associated data acquisition subsystem 205a, . . . , 205n to the server 215 via the network 210. For example, the LDC may include an RS-485 to Ethernet bridge such as a Net485-Intelligent RS485 to Ethernet adapter or an OpenNetCom 423 RS-485 to Ethernet communication device. These exemplary LDCs use an ARM-9 type of processor. An LDC may provide MAC (media access control) for each associated sensor module (in particular, the sensor module's interface module). The RS-485 standard does not provide a MAC protocol. A MAC, useful with relatively robust data acquisition system useful for condition-based maintenance consistent with the present disclosure, is generally defined herein. A MAC may be utilized to prevent multiple sensor modules from attempting to access the bus simultaneously, i.e., may be used to prevent collisions.

Exemplary Command Protocol

For example, a MAC protocol may include a command and response structure in which a server controls communication with the LDCs and/or sensor modules ("devices"). For each communication the server may issue a command to the LDC and/or sensor module and the LDC and/or sensor module may respond. Communication to a sensor module may include two parts: server to LDC and LDC to sensor module. The sensor modules, using their associated interface modules, are configured to respond to commands from an associated LDC. The sensor modules may not initiate communication with the associated LDC. Messages from sensor modules may therefore be in response to requests and/or commands from an LDC. For example, an LDC may receive a command and/or request directed to an associated sensor module. The LDC may then relay the command and/or request to the sensor module. The command and/or request may command the sensor module to acquire sensor data, analyze received sensor data and/or transmit module output data. The module output data may be representative of a condition of a component and/or a machine being monitored, as described herein. Accordingly, each command may include an LDC prefix and a device (i.e., sensor module) command. An exemplary MAC protocol definition is set forth below.

MAC Protocol Definition

The MAC protocol is a command/response approach where the server may control communication with the LDCs and sensor modules ("devices"). For each communication the server issues a command to the device, and the device responds.

Command Message Structure

Since all communication to a device is a two step process, server=>LDC=>sensor module each command is two parts, an LDC prefix and a device command.

LDC Command Prefix

Figure 6:
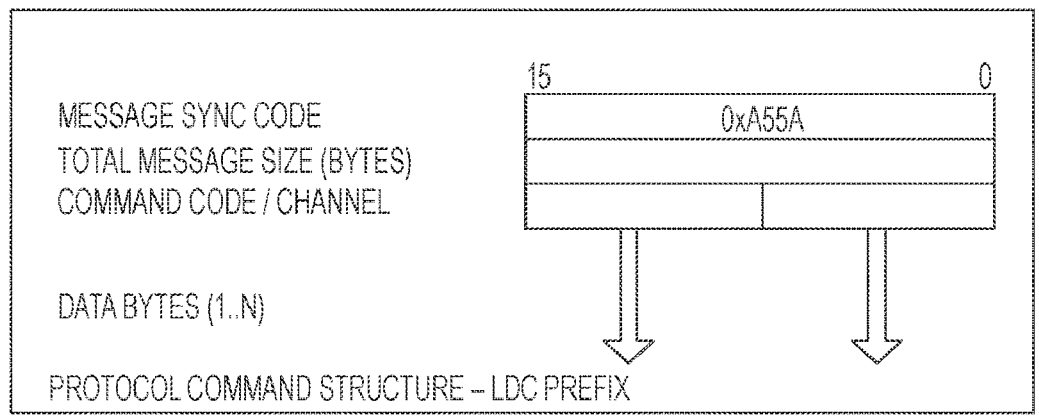
FIG. 6 shows the format of the LDC prefix consistent the present disclosure.

The format of the LDC Prefix is shown in FIG. 6. For Commands that are specific to the LDC the Data Bytes following the LDC prefix contain the LDC command specific data. For all device commands the Data Bytes following the LDC Prefix contain the Device Command. When a command is received by an LDC it will either process an LDC command or forward the Device Command portion of the message to the device on the channel indicated. The field definitions for the LDC Command Prefix are shown in Table 1.

TABLE 1

LDC Prefix field definitions

| Field | Size (Byte) | Description |
| --- | --- | --- |
| Message Sync Code | 2 | Fixed content field that identifies the message as an LDC message. |
| Total Message Size | 2 | The total size of the message including the Sync Code and all Data Bytes. |
| Command Code | 1 | The LDC specific command. |
| Channel | 1 | The LDC Channel that a devices command is sent on. |

Sensor Module (Device) Command

Figure 7:
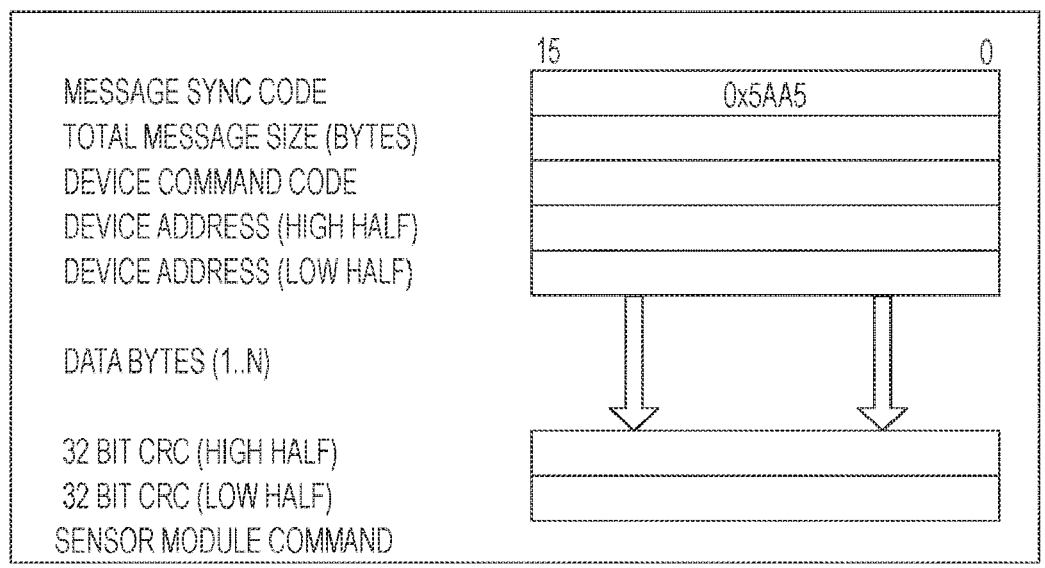
FIG. 7 shows command set for the Sensor Module device interface consistent the present disclosure.

The command set for the Sensor Module (interface module) is shown in FIG. 7. The field definitions for the Sensor Module Commands are shown in Table 2.

TABLE 2

Sensor Module Command Fields

| Field | Size (Byte) | Description |
| --- | --- | --- |
| Message Sync Code | 2 | Fixed content field that identifies the message as a Device message. |
| Total Message Size | 2 | The total size of the message including the Sync Code and the CRC. |
| Device Command Code | 2 | The Device specific command. |
| Device Address | 4 | The ID (Serial Number) of the device being commanded. A zero (0) value is used for a broadcast command. |
| CRC | 4 | The 32 bit CRC of all the data bytes in the message. |

LDC Response Message Structure

Figure 8:
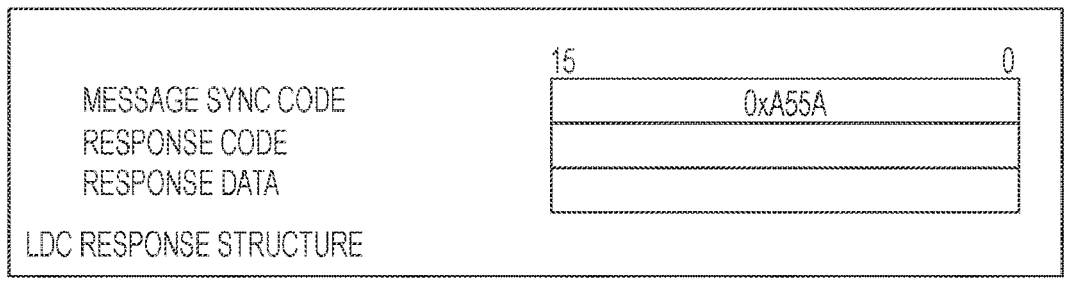
FIG. 8 shows the structure of the responses originating from the LDC consistent the present disclosure.

The structure of the responses originating from the LDC is shown in FIG. 8. For commands that are LDC specific commands the LDC responds as shown. For commands that pass through the LDC to the Sensor Module, the LDC is silent and the response comes directly from the addressed Device. The field definitions for the LDC Response are shown in Table 3.

TABLE 3

LDC Response field definitions

| Field | Size (Byte) | Description |
|---|---|---|
| Message Sync Code | 2 | Fixed content field that identifies the message as an LDC message. |
| Response Code | 2 | The LDC response. Success or Failure |
| Response Data | 2 | Any additional data. |

Sensor Module Response Structure

Figure 9:
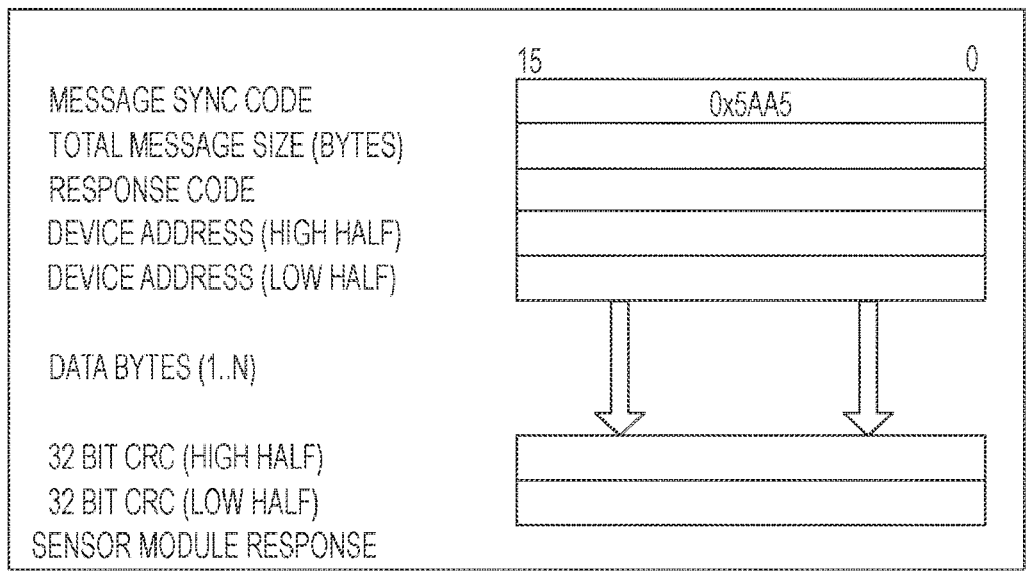
FIG. 9 shows the structure of the responses originating from the Sensor Module consistent the present disclosure.

The structure of the responses originating from the Sensor Module is shown in FIG. 9. The field definitions for the Sensor Module Commands are shown in Table 4.

TABLE 4

Sensor Module Response Fields

| Field | Size (Byte) | Description |
|---|---|---|
| Message Sync Code | 2 | Fixed content field that identifies the message as a Device message. |
| Total Message Size | 2 | The total size of the message including the Sync Code and the CRC. |
| Device Response Code | 2 | The Device specific response. |
| Device Address | 4 | The ID (Serial Number) of the device issuing the response. |
| CRC | 4 | The 32 bit CRC of all the data bytes in the message. |

Bite Ordering

Message fields that contain values which are larger than a single byte will be transmitted in Network Byte Order, high byte first and low byte last.

Commands/Responses

LDC Commands

There are two LDC commands, Channel Setup, and the command indicating a Device Command to be forwarded to a device.

LDC Response

For those commands where the LUC responds it will send one of the following response codes: 0x0000—Success or 0xFFFF—Failure. In the event of a failure the response specific data is the specific failure information indicated for that command.

Channel Setup Command

The Channel Setup Command sets the channel state for any subsequent commands on the channel.

| | |
|---|---|
| command code | 0x01 |
| type | LDC Command |
| command specific data | The channel (serial port) setup string. |
| response code | 0x0000 Success/0xFFFF Failure |
| response specific data (Success) | 0x0000 |
| response specific data (Failure) | 0x0000 (TBD) |

The channel setup string consists of four fields which indicate the setup to be applied to the channel. Since the channels are currently serial interfaces the setup consists of the following fields. The serial type, either 232 or 485 indicated by a '2' or '4' in the first character position.

The BAUD Rate as an integer value indicating the speed of the port followed by the character 'K'. The Parity to be applied is a single character:

'N' for No Parity;
'E' for Even Parity;
'O' for Odd Parity;
'M' for Mark Parity;
'S' for Space Parity.

The number of data bits as an integer value, typically 8. The number of Stop bits, '0', '1', or '2'. Some examples:

2115KN81=232 mode, 115K Baud, No Parity, 8 Data bits, 1 Stop bit.

43600KO82=485 mode, 3.6M Baud, Odd Parity, 8 Data bits, 2 Stop bit.

Device Command

The LDC Device Command informs the LDC that there is a device (i.e. sensor module) specific command in the data portion of the LDC command to be transmitted on the channel indicated in the command. The LDC does not respond to this command.

| | |
|---|---|
| command code | 0x02 |
| type | LDC Prefix |
| command specific data | The Device Command. |
| response code | None |
| response specific data | None |

Sensor Module Commands

The commands and responses for the Sensor Module are shown in the following paragraphs, wherein "sensor module" and "device" are used interchangeably. Each sensor is interfaced to, and controlled by, an RS-485 serial interface module, which sets-up and controls the data acquisition of the specific sensor. The RS-485 devices are attached to the LDC on a specific multi-drop channel. The commands and responses which follow are addressed to all devices to perform generic setup functions, or to specific devices to setup, perform an acquisition (i.e., acquire sensor data), retrieve the sensor data, transmit the sensor data and/or module output data, and/or analyze the acquired sensor data.

Sensor Module Response

For those commands where the Sensor Module response is success or failure, the sensor module may transmit one of the following response codes: 0x0000—Success, 0xFFFF—Failure, or 0xFFFE—CRC Failure. In the event of a failure, the response may include response specific data such as the specific failure information indicated for the command.

Set Termination Command

The Set Termination Command is used to enable the termination resistor in the RS 485 multi-drop configuration.

| | |
|---|---|
| command code | 0x0001 |
| type | Device Specific |
| command specific data | 0x0000 - disable the resistor |
| command specific data | 0x0001 - enable the resistor |
| response code | 0x0000 - Success, 0xFFFF - Failure |
| response specific data | None |

Set Response Delay Command

The Set Response Delay Command is used to set up the delay between receiving a command on the 485 multi-drop bus and responding to the command. Since the 485 bus is a half duplex implementation this allows the bus master time to change from transmit to receive mode. The devices on the bus do not respond to this command.

| | |
|---|---|
| command code | 0x0002 |
| type | Device Broadcast |
| command specific data | Delay period. 4 byte unsigned value. Microseconds. |

Set Serial Number Command

The Set Serial Number Command is used to set the serial number that the device will respond to and report on. For example, in response to the set serial number command, the sensor module may write (i.e., store) a unique serial number to nonvolatile memory in the interface module. This command may be used in an off-line environment where there is only a bus master, e.g., LDC, and one device on the bus.

| | |
|---|---|
| command code | 0x0003 |
| type | Device Specific |
| command specific data | None or may specify the serial number |
| response code | 0x0000 - Success, 0xFFFF - Failure |
| response specific data | None |

Set Auto Range Command

The Set Auto Range Command is used to calculate the auto range value for the device. The auto range value is the least significant bit, or start bit, of a 16 bit sample within the 24 bit ADC buffer.

| | |
|---|---|
| command code | 0x0004 |
| command specific data | 4 byte integer specifying the number of ADC samples to acquire when performing the auto range command. |
| response code | 0x0000 - Success, 0xFFFF - Failure |
| response specific data (Success) | 4 byte integer specifying the LSB of the collected samples. |
| response specific data (Failure) | None |

Set Gain Command

The Set Gain Command is used to set the gain of the device.

| | |
|---|---|
| command code | 0x0005 |
| type | Device Specific |
| command specific data | 4 byte unsigned value ? |
| response code | 0x0000 - Success, 0xFFFF - Failure |
| response specific data | None |

Set Sample Rate Command

The Set Sample Rate Command is used to set the period between each sample collected by the device by setting a sample rate in samples per second.

| | |
|---|---|
| command code | 0x0006 |
| type | Device Specific |
| command specific data | 4 byte unsigned value. The number of samples to collect in one second. |
| response code | 0x0000 - Success, 0xFFFF - Failure |
| response specific data | None |

Set Sample Count Command

The Set Sample Count Command is used to set the total number of samples collected by the device on the next activation.

| | |
|---|---|
| command code | 0x0007 |
| type | Device Specific |
| command specific data | 4 byte unsigned value - the number of 16 bit samples to collect |
| response code | 0x0000 - Success, 0xFFFF - Failure |
| response specific data | None |

Get Serial Number Command

The Get Serial Number Command is used to determine the serial numbers of all the connected devices on a channel. Each device on the multi-drop network responds with its serial number. Collision avoidance is used to ensure all devices may respond successfully. The serial number may be embedded in the response rather than in the response specific data.

| | |
|---|---|
| command code | 0x0008 |
| type | Device Broadcast |
| command specific data | None |
| response code | 0x0000 - Success, 0xFFFF - Failure |
| response specific data | None |

Get Configuration Command

The Get Configuration Command is used to retrieve the currently set configuration of a device. It may be used for debug purposes to display the string in a user friendly manner.

| | |
|---|---|
| command code | 0x0009 |
| type | Device Specific |
| command specific data | None |
| response code | 0x0000 - Success, 0xFFFF - Failure |
| response specific data (Success) | String containing the device configuration. TBD |
| response specific data (Failure) | None |

Get Status Command

The Get Status Command is used to retrieve a set of formatted status flags which indicate the state of the device.

| | |
|---|---|
| command code | 0x000a |
| type | Device Specific |
| command specific data | None |
| response code | 0x0000 - Success, 0xFFFF - Failure |
| response specific data (Success) | 1 byte Clipping flag - 1 if clipping has occurred since the last request, 0 otherwise. |
| response specific data (Success) | Additional status TBD |
| response specific data (Failure) | None |

Sleep Command

The Sleep Command is used to inhibit data collection for a device. In order to allow multiple devices to perform synchronous collection all devices may be placed in 'sleep' mode, then some set of individual devices may be enabled with a 'Prepare to Acquire' command. Only those devices addressed by the 'Prepare to Acquire' command may respond to a subsequent 'Start Acquisition' command.

| | |
|---|---|
| command code | 0x000b |
| type | Device Broadcast |

|  |  |
| --- | --- |
| command specific data | None |
| response code | None |
| response specific data | None |

Prepare to Acquire Command

The Prepare To Acquire Command is used to enable data collection for a device. In order to allow multiple devices to perform synchronous collection all devices are placed in 'sleep' mode, then a set of individual devices are enabled with a 'Prepare to Acquire' command. Only those devices addressed by the 'Prepare to Acquire' command respond to a subsequent 'Start Acquisition' command.

|  |  |
| --- | --- |
| command code | 0x000c |
| type | Device Specific |
| command specific data | None |
| response code | 0x0000 - Success, 0xFFFF - Failure |
| response specific data | None |

Start Acquisition Command

The Start Acquisition Command is used to trigger data collection for a device. Data may be acquired at the rate set up by the 'Set Sample Rate' command, and for the number of samples set by the 'Set Sample Count' command. When the sample collection completes the device may send a response indicating the success or failure of the acquisition.

|  |  |
| --- | --- |
| command code | 0x000d |
| type | Device Specific |
| command specific data | None |
| response code | 0x0000 - Success, 0xFFFF - Failure |
| response specific data | None |

Transmit Acquired Data Command

The Transmit Acquired Data Command is used to read the data collected by a device. The bus master, e.g., LDC and/or server, may request data and, in response the device may send it. After a collection is complete the bus master, e.g., LDC, may request data packets until all data that was collected is received. The bus master, e.g., LDC, may control re-transmission of a specific data set by controlling the offset of the data requested.

|  |  |
| --- | --- |
| command code | 0x000e |
| type | Device Specific |
| command specific data | 4 byte integer specifying the offset in the sample data to transmit from. |
| command specific data | 4 byte integer specifying the number of 16 bit sample data words to transmit. |
| response code | 0x0000 - Success, 0xFFFF - Failure |
| response specific data (Success) | The sample data requested. |
| response specific data (Failure) | None |

For a data acquisition subsystem configured to acquire sensor data, analyze the acquired sensor data (e.g., by a sensor module), and/or transmit module output data, commands from, e.g., the LDC, to an associated sensor module may include the following.

Set Serial Number: Configured to cause a sensor module to store a unique serial number in nonvolatile memory.

Set Hardware Version: Configured to cause a sensor module to store a hardware version number in nonvolatile memory.

Set Location for a sensor with a given Serial Number: Each sensor is associated with a specific location. During rigging, the sensor location may be set. Accordingly, commands to perform a particular operation are associated with a location.

Set Termination. By default, Termination is True: A configuration file may provide the location which may then provide the termination.

Set Configuration: configured to cause the sensor module to upload the configuration file to the LDC and/or server.

Sensor Module Response: The sensor module may respond Success, Failure and/or a command-specific response.

Prepare to Acquire: A sensor module may be commanded to prepare to acquire data, e.g., based on a time since a last acquisition and parameter, e.g., RPM, greater than a threshold. The sensor module may not transmit a response. The Prepare to Acquire command may include an update of system time, may "wake up" the sensor module and may cause the sensor module to initiate a pre-sample.

Acquire: Commands the sensor module to acquire data. No response required from the sensor module. May cause the sensor module to acquire sensor data and/or store a number, e.g., 16, of bits in memory (in the sensor module).

Get Serial Number for a Location: When rigging, i.e., configuring a data acquisition subsystem, the location may be NULL. The rigging program is configured to request the serial number of the sensor module with a NULL location. The newest sensor module may have NULL for location and may then be assigned a location, as appropriate.

Get Hardware Version: Requests current hardware version number of a sensor module.

Get Software Version: Requests current software version number of a sensor module.

Get Configuration Version: Requests current configuration version number of a sensor module.

Get Configuration, Full: Requests full configuration data associated with a sensor module.

Get Configuration, Dynamic: Requests date and/or time of last acquisition and last gain setting.

Get Analysis Data: Requests that the sensor module transmit results associated with the last data analyzed. May include condition indicator (CI) data and/or health indicator (HI) data, as described herein. The sensor module may transmit Failure, if the analysis is not yet complete.

Get Time Synchronous Average: Requests a last valid time synchronous average (TSA) for a specific sensor module.

Get Bearing Spectrum: Requests a last valid Bearing Spectrum for a given sensor. Bearing Spectrum corresponds to a sliding window of TSA data and bearing spectra (i.e. envelope spectra) that are configured to provide a limited history, e.g., the last m results. Shaft and gear analysis may be reconstructed from TSA data.

Get Raw Data: Requests acquired sensor data from a last valid data acquisition for a specified sensor.

Set Stream Raw Data Sample Rate: Self-explanatory.

Set Stream Raw Data Sample Length: Self-explanatory.

Stream Raw Data: Commands specified sensor module to stream raw data (i.e., acquired sensor data), using full gain.

Get BIT: Requests performance of a built in test.

Get Debug Information

Get RPM: Commands a sensor module with a tachometer as a sensor to calculate a current RPM.

Send Tachometer Data: Requests that a sensor module with a tachometer as the sensor to transmit the following data:

Vector of relative zero crossings;
Mean RPM over sample period;
Standard deviation of RPM over sample period; and
Pulse per revolution.

Typically, LDC to sensor module commands result in data transfer between a sensor module and the associated LDC. In response to the Send Tachometer Data command, other (non-tachometer) sensor modules are configured to receive and store tachometer data, including RPM for analysis. For example, sensor modules that include accelerometers may utilize the tachometer data for analyzing accelerometer data, e.g., vibration data. It should be noted that this command results in sensor module to sensor module communication. In other words, the command to Send Tachometer data also commands associated accelerometer modules to capture (i.e., receive) the transmitted tachometer data from the bus.

Although some of the protocol definitions refer to accelerometers and/or tachometers, it will be appreciated by those of ordinary skill in the art that the protocol may be applied to any sensor. The specific fields included in a command may depend on the particular sensor.

In this manner, commands from the server to an LDC and/or associated devices may be transmitted from the server to the LDC and, depending on the command, to one or more associated devices. The server may then control data acquisition and/or may receive data for analysis. Results of the data analysis may then be used to determine and/or assess a condition, status and/or state of a component and/or a monitored machine and/or piece of equipment. A system configured generally according to the present disclosure may allow a server to be located remote from the monitored machine and/or piece of equipment such that the server may not be required to withstand a harsh environment.

For example, a system consistent with the present disclosure may be used for condition-based maintenance for wind turbines. Condition-based maintenance monitoring for wind turbines may include a number of types of monitoring. For example, the monitoring may include Exceedance Monitoring. Exceedance Monitoring may include recording parametric data and identifying when monitored a component exceeds nominal operating conditions. This parametric data is typically sampled at a low rate (e.g., 15 sps or less). The extent and length of an exceedance may be recorded. Examples of parameters that may be monitored for exceedances include: oil temperature, RPM, Difference in Yaw angle between turbine and wind, wind speed, etc.

Monitoring may include Mechanical Diagnostic/Prognostics (MD). MD monitoring may include processing vibration data with appropriate configuration data to determine a current and future state of rotating machinery. Typically, this may include the health of shafts, gears and bearings. The sensors may be industrial accelerometers which may be relatively expensive. For example, existing systems (including sensor and acquisition system) typically sample at greater than 50 KSPS and may cost $1000 channel. MD may facilitate "On Condition" maintenance practices and "Opportunistic Maintenance", in which maintenance may be conducted preventively on components that will be out of tolerance in the future, but may be convenient to perform maintenance on because of operational considerations.

Monitoring may include Operational Usage (OU). OU monitoring may include accumulated usage on a machine and/or piece of equipment. Typically OU may include operating hours. OU may include power hours and/or another measure of usage. Historically, OU typically was a driver for scheduled maintenance practices.

Monitoring may include Structural Usage Monitoring. Structural Usage Monitoring may include using parametric data representative of load (such as wind speed, power output, turbine RPM, wind yaw angle, etc) to determine an operating regime of a turbine. For life limited parts, damage associated with the regime may be accumulated on the serialized part. This may be used to extend Time Between Overhaul over traditional operation usage based maintenance systems. The damage factors may be determined from design loads and/or through testing (such as structural loads monitoring).

Monitoring may include Structural Loads Monitoring. Structural Loads Monitoring may include direct measurement of load on life-limited parts. For example, the measurement may be made using strain gauges and/or fiber optics (e.g., Bragg Gratings). Typically, this applied to a small number of units. This data, along with instrumentation (e.g., parametric data) may be used to validate a structural usage monitoring capability.

Monitoring may include Structural Health Monitoring. Structural health monitoring may include using an active (e.g., Guide or Bulk Wave Ultrasonic) and/or passive (e.g., Acoustic Emissions) sensor to detect damage to critical structures. Because of technical challenges this type of monitoring may be appropriate for aging structures where service history has identified design issues that may require new and/or onerous inspections.

A system and method consistent with the present disclosure may be configured for any one or more of the monitoring strategies described herein. A monitoring strategy may be added with relatively minimal change in system design. A system consistent with the present disclosure may provide flexibility by facilitating adding sensors by adding an additional interface module coupled to the bus and LDC, as described herein. Sensors may be analog and/or digital, as described herein. The interface module may be configured to digitize analog sensor data and to provide the digital data to an associated LDC for transmission to a server. The interface module may be configured to analyze acquired sensor data as described herein. The server may be configured to receive the digital data and may be configured for data analysis, user interface and/or engineering studies.

For example, a system consistent with the present disclosure and configured for monitoring, e.g., a wind turbine, may be configured for acquiring parametric and/or vibration data. For example, the system may include about 12 to about 20 accelerometers configured for monitoring a gearbox, generator, input shaft and/or main bearing. An LDC may be included, configured as a RS-485 to Ethernet bridge for managing and/or collecting parametric and/or vibration data. Such a system may include: 12 to 20 industrial accelerometers, +/−10% accuracy, a Hall sensor for tachometer pickup, a relatively high speed (e.g., 105 KHz) 16 bit interface module for each accelerometer and tachometer, a relatively low speed (e.g., 15 SPS) 16 interface module for each eight parameters that are monitored, wiring harness for high speed sensors, wiring harness for low speed sensors, Ethernet cable to tie into existing infrastructure, and a Server Application.

Exemplary Configuration Data

In some embodiments, each sensor module may be configured to analyze acquired sensor data, as described herein. Each interface module may then include an application program (e.g., stored in memory) configured to analyze the acquired sensor data. In order to relate the sensor data and/or module output data to a particular component and/or particular machine, configuration data may be utilized to identify and/or specify the particular component and/or parameters associated with the component and/or the analysis. The configuration data may be machine-specific and the configuration data described herein may be modified accordingly, while remaining within the scope of the present disclosure.

For example, server memory 254 and/or server storage 256 may be configured to store configuration data for each data acquisition subsystem 205. In another example, memory 307 in the LDC 230 and/or memory 420 in an interface module 240 may be configured to store configuration data for associated sensor module(s). Configuration data may include LDC addresses, and interface module address(es) associated with each LDC. Configuration data may describe analytically a physical relationship between a component and a monitored system. Configuration data may include an indication of specific algorithms used for Condition indicator and/or Health Indicator calculations, as described herein.

Configuration data associated with each LDC includes: a site location, a tower identifier corresponding to the tower associated with the a tower type, a generator model and/or type, a number n of sensors. Each LDC may be associated with at least two types of sensors: vibration sensor modules i.e., accelerometer sensor modules ("CAMs")) and a tachometer sensor module ("CAT"). Configuration data associated with a tachometer sensor module includes a number of pulses per revolution associated with the tachometer takeoff (i.e., tachometer output). Each LDC may be further associated with other types of sensor modules, e.g., oil debris sensors, oil viscosity sensors, strain sensors, acoustic sensors and/or other sensors.

Configuration data associated with each monitored component (e.g., Shaft, Gear, Bearing, Sensor) for a gearbox type may include a Health Indicator ID. Configuration data associated with each Health Indicator II) may include: an index of condition indicators (CIs) for use in a HI calculation, a vector of scale values to be applied to the CIs for the HI calculation(s), and/or a vector of offset values to be applied to the CIs for the HI calculation(s).

Configuration data associated with each CAM may include an associated name and/or location and/or a Health indicator ID. Each CAM may be configured to analyze from 1 to j shafts.

Configuration data associated with each shaft includes: a shaft name, a shaft ratio relative to the tachometer, a shaft sample rate (SR), a shaft sample duration (SD), and/or a Health Indicator ID. For example, a product of the shaft sample duration multiplied by the shaft sample rate may yield a number of data points. Each Shaft may have from 0 to k associated Gears.

Configuration data associated with each gear includes: a gear name, a number of teeth, a bandwidth relative to the number of teeth and/or a Health Indicator ID. For example, for a gear with 32 teeth and a bandwidth of 4, analysis, as described herein, may be performed on 32/4=8 FFT (Fast Fourier Transform) "bins" on each side of the number of teeth, i.e., bins 24 (32 minus 8) through 40 (32 plus 8).

Configuration data associated with each accelerometer sensor module includes from 0 to l associated Bearing Windows and an RPM received from, e.g., the tachometer sensor module. For each Bearing Window and sample rate, a common spectrum may be processed for input for generating a bearing CI for each bearing that has a common window and sample rate. Bearing window corresponds to a pass band frequency in a bearing envelope analysis.

Configuration data associated with each Window includes from 0 to m Bearings.

Configuration data associated with each bearing includes a bearing name, a bearing health indicator ID, a ball ratio, a cage ratio, an inner race ratio, an outer race ratio, and/or an upper and a lower window frequency.

Configuration data associated with each Health Indicator includes a Health Indicator ID value, a list of Condition Indicator indices that represent (identify) the CIs that may be used in the HI calculation, a list of offset values and/or a list of scale values. A Health Indicator may be determined based on between 1 and n CIs. There is a one to one mapping of offset values to CIs used in the HI calculation. There are in scale values for n CI values, where m=SUM (1:n).

Generally, configuration data is a collection of data related to the equipment and/or machine being monitored, the data acquisition subsystem configured to perform the monitoring and/or the analyses to be performed on acquired sensor output data. The specific information in the configuration data may depend on the equipment being monitored and the particular elements of the data acquisition subsystem. Configuration data may be used by the condition-based monitoring system and/or the data acquisition subsystem to specify parameters utilized in performing data acquisition and/or analysis. At least some of the elements of the configuration data may be user-defined.

Rigging is the process of assembling a CAM sensor into a network. Each CAM devices may be delivered without configuration data set. The rigging function is configured to step a user through assembling each CAM (or CAT) on to the network, identifying the sensor, assigning a position/ID of the sensor, and uploading the appropriate configuration for that position on the network. The rigging application also allows for changing sensors for maintenance if a sensor fails.

Configuration steps may include: Connecting a sensor and sending a command to get a serial number of the sensor. Initially, the sensor location is null and terminated. The command may return a serial number. The LDC may then associate the serial number with a first location. Location ID, location ID configuration may then be uploaded and termination may be set to false if the location ID is not end. A next sensor may then be added.

Exemplary Methodology

Figure 10C:
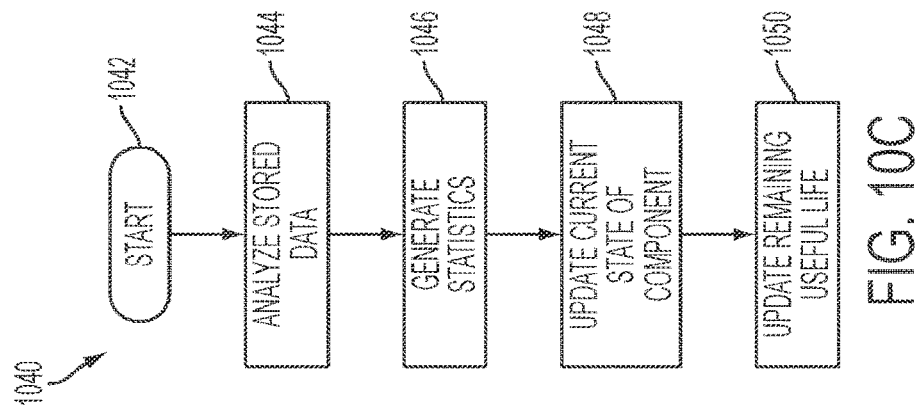
FIGS. 10A through 10C are exemplary flow charts consistent with the present disclosure.
Figure 10B:
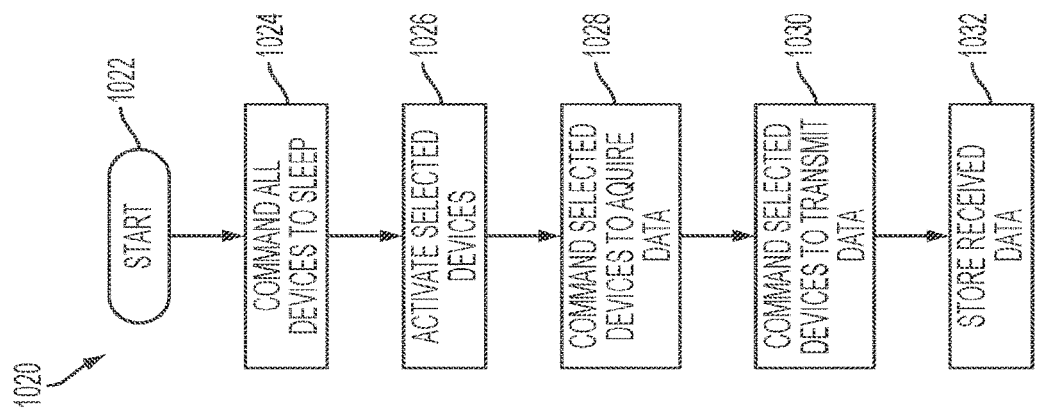
Figure 10A:
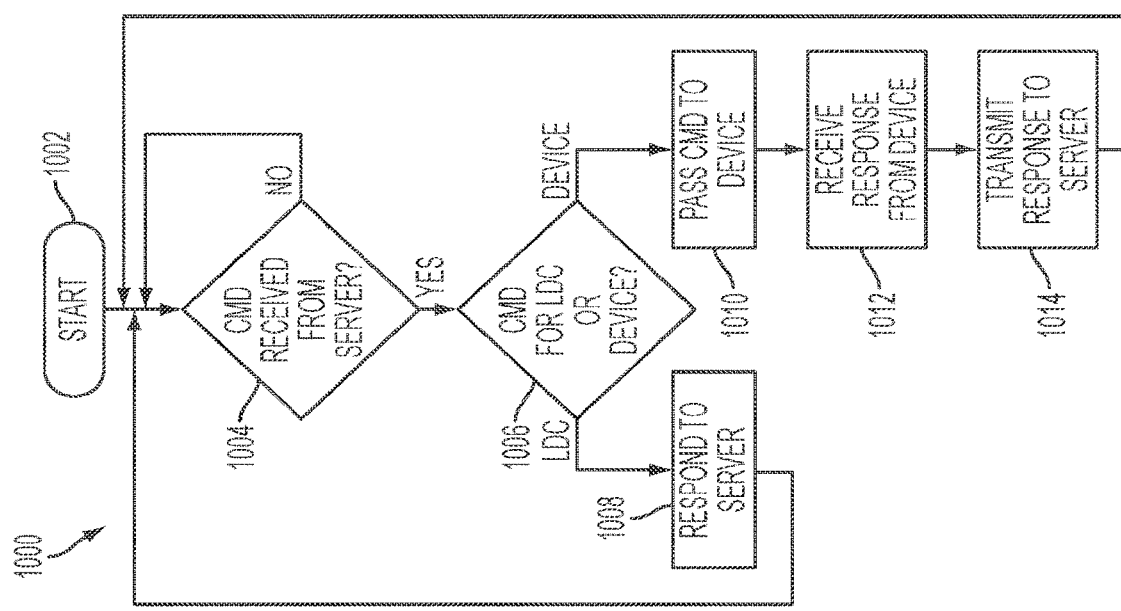

FIGS. 10A through 10C are exemplary flow charts for data acquisition and/or analysis consistent with the present disclosure. FIG. 10A is a flow chart 1000 for operations that may be performed by an LDC. FIG. 10B is a flow chart 1020 that may be performed by the server and/or and LDC. FIG. 10C is a flow chart 1040 of operations that may be performed by a sensor module and/or the server.

Turning to FIG. 10A, program flow may begin at start 1002. Whether a command has been received from a server may be determined 1004. If a command has been received, whether the command is directed to the LDC or a device (i.e., sensor module) may then be determined 1006. If the command is directed to the LDC, the LDC may respond to the command 1008. Program flow may then return to determining whether a command has been received from the server. If the command is directed to a device, the LDC may pass 1010 the command to the device (or devices). A response may then be received 1012 from the device. It will be appreciated by those of ordinary skill in the art that this operation may include determining whether a response has been received and/or waiting for the response. The response may then be transmitted 1014 to the server. Program flow may then return to determining whether a command has been received from the server.

Turning to FIG. 10B, program flow may begin at start 1022. All devices (i.e., sensor modules) may be commanded 1024 to sleep. For example, if no data is to be acquired, all devices may be commanded to sleep. Sleep may correspond to a low power mode. A selected one or more devices may then be activated 1026. The selected device(s) may then be commanded 1028 to acquire data. The selected device(s) may then be commanded 1030 to transmit the acquired data. The acquired data may then be stored 1032. For example, the server and/or LDC may provide the commands and may be configured to receive and/or store the acquired data.

Turning to FIG. 10C, program flow may begin at start 1042. Stored data may be analyzed 1044. Statistics may be generated 1046 based, for example, on the analyzed data and/or analysis. The current state of a component may then be updated 1048 based on, for example, the stored and/or analyzed data. The component remaining useful life may then be updated 1050.

Condition Indicators Health Indicators

An application program may be configured to process usage and/or status, i.e., sensor output (e.g., vibration) data, that may used to update the status of components monitored by the data acquisition subsystem. In some embodiments, a controller, e.g., controller 305, in a sensor module may be configured to process (e.g., analyze) usage, status and/or sensor output (e.g., vibration) data. In some embodiments, the server may be configured to process and/or analyze health and/or sensor output (e.g., vibration) data. There may be, for example, two types of indicators: condition indicators (CI) and health indicators (HI). CI indicators may result from transforming sensor data, e.g., vibration data and/or data based on sensor data, into statistics, which may represent the condition of a component, such as a shaft, gear, bearing or the sensor itself. HI may use one or more CIs and/or configuration data to update the current state of the component, and may be used to provide a remaining useful life for the component.

For example, the memory in a sensor module and/or the server may be configured to store raw data from each sensor, and/or processed (e.g., CI and/or HI) data for each monitored component. For example, historic raw vibration data may be stored and may be useful for development and/or refinement of the CI and HI algorithms. CI/HI data may be stored in server memory to allow relatively quick retrieval for plotting, trending, and fleet comparison of CI/HI data for analysis and logistics planning.

Condition Indicators (CIs) are configured to provide an inference into the health, i.e., condition, of a monitored component and/or a sensor. Condition Indicators may be based, at least in part, on statistical analyses and/or deterministic analyses of acquired sensor output data. For example, for a wind turbine and/or other rotating machinery), Condition Indicators may include: Shaft Indicators, Gear Indicators, Bearing indicators and Sensor Indicators. Health Indicators (His) may be based at least in part on one or more Condition Indicators. Health Indicators are configured to provide a measure of the health, i.e., condition, of the monitored component that may then be utilized in determining an estimate of remaining useful life, as described herein. Statistical analyses include:

RMS: Root Mean Square Error RMS= $\sqrt{1/n \Sigma_{i=1}^{n}(x_i - E[x])^2}$,

Kurtosis: Kurt=$(1/n \Sigma_{i=1}^{n}(x_i - E[x])^4)/(1/n \Sigma_{i=1}^{n}(x_i - E[x])^2)^2 - 3$, Peak to Peak: $P2P=(\max(x) - \min(x))/2$, and Crest Factor: $CF=P2P/RMS$.

$E[x]$ corresponds to the expected (i.e., mean) value of the data values in a vector of data where x corresponds to the vector of data. $x_i$ corresponds to the $i^{th}$ data value (i.e., one sample) in the vector of data where i is an index and n is the number of values (i.e., samples) of data in the vector of data. The data may be sensor data and/or may be based, at least in part, on acquired sensor data. For example, the number, n, of data values in the vector of data may be related to a revolution of a rotating shaft. $E[x]$ may then be calculated over the revolution of the rotating shaft. Calculating condition indicators over a revolution of the rotating shaft is configured to account for variations in rotational speed of the shaft, as described herein.

Root mean square error (RMS) is configured to provide an indication of a variation between the data values in the vector of data and the mean value of the vector of data. Kurtosis is configured to provide an indication of whether variation between data values in the vector of data and the mean value is due to relatively fewer, relatively large differences or relatively more, relatively small differences. Peak to Peak is configured to provide an indication of a range of values of the vector of data. Crest Factor is configured to provide a ratio of the range of values to the root mean square error value.

The CIs are configured to increase a signal to noise ratio of a fault signature associated with a monitored component. In general, a particular fault signature depends on the component (e.g., shaft, bearing, or gear) being monitored.

For example, Shaft Faults may be characterized by changes in shaft order 1 (out of balance), shaft order 2 (bent shaft) and/or shaft order 2 and 3 (coupling failure). Gear faults may be characterized by four basic failure modes: Increased noise due to tooth face surface pitting and/or spalling, periodic impact due to soft and/or cracked tooth, amplitude and/or frequency modulation of gear mesh tone from uneven loading due to a soft and/or cracked tooth, and/or sideband modulation and/or hunting due to gear misalignment. Bearing faults may be characterized as modulated impact due to spilling and/or pitting of the bearing elements (e.g., ball(s), inner race, outer race and/or cage).

Deterministic analyses of acquired sensor output data may be used to facilitate fault detection in a monitored component and/or machine. Deterministic analyses include signal averaging, residual, energy operator, narrow band signal, amplitude modulation, frequency modulation, figure of merit, sideband modulation, G2 analysis and bearing envelope analysis.

Figure 11:
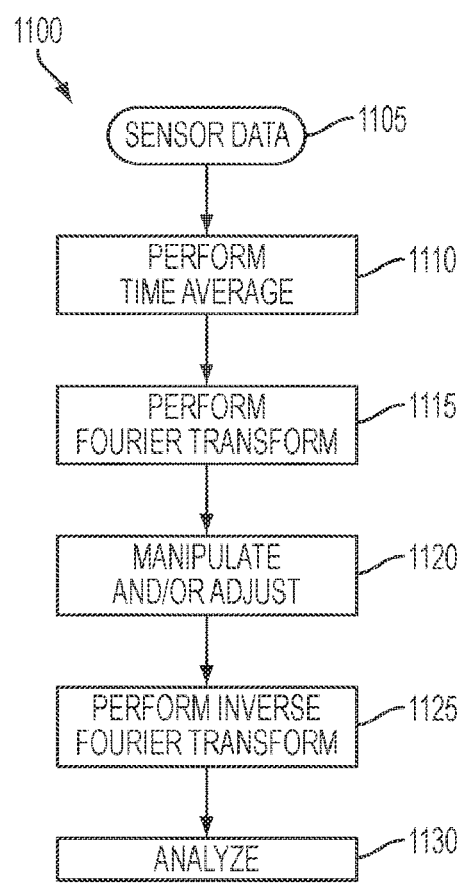
FIG. 11 is an exemplary flow chart illustrating deterministic analyses consistent with the present disclosure.

FIG. 11 is an exemplary flow chart 1100 illustrating deterministic analyses consistent with the present disclosure. It is assumed that sensor data has been acquired and is available for analysis. Flow may therefore begin with sensor data 1105. A time average may be performed 1110. For example, a time synchronous average may be determined for acquired sensor data, as described herein. A Fourier Transform, e.g., a fast Fourier Transform (FFT), may be performed 1115 on the time average sensor data to determine a frequency spectrum (spectral data). For example, a gear mesh tone corresponds to frequency in, e.g., vibration data acquired by a gear sensor. The spectral data may then be manipulated at operation 1120. For example, a residual may be determined. A residual is a result of eliminating (e.g., by setting to zero) one or more harmonics ("bins") in the frequency spectrum. The result may then be transformed from the frequency domain into the time domain by performing, e.g., an inverse. Fourier transform 1125. The time domain vector may then be analyzed at operation 1130.

Signal Averaging: Signal Averaging (SA) is a signal processing technique that is configured to extract periodic waveforms from noisy data. In gearbox analysis, for example, SA may allow a vibration signature of a gear under analysis to be separated from other gears and from noise sources in the gearbox that are not synchronous with the gear being analyzed. Variations in shaft speed may be corrected that may result a spreading of spectral energy into an adjacent gear mesh bin.

For example, time synchronous averaging (TSA) may be used to generate an averaged signal, i.e., a vector of averaged sensor data, from acquired sensor data. For example, for a wind turbine, e.g., wind turbine 110, sensor modules may include a tachometer sensor module (CAT) and a number of accelerometer (e.g., vibration) sensor modules (CAMs). The CAT is configured to detect rotational speed (e.g., RPM) of the coupling and/or shaft. The CAMs are configured to detect vibrations associated with the shaft, gears and/or bearings. Based at least in part, on the tachometer takeoff (i.e., tachometer output), RPM for the shaft may be determined.

TSA is configured to provide a signal average over a revolution of, e.g., the shaft. The CAMs are configured to acquire vibration data at a sample rate, r, while the CAT is acquiring the rotational speed of the shaft. For example, the acquisition period (i.e., duration of the acquisition) may be in the range of 2 seconds to 10 seconds. The rotational speed of the shaft may vary during the acquisition. Because the CAMs' sample rate, r, may be substantially constant during the acquisition, a number of samples of vibration data per revolution (REV) may vary because of variation in the rotational speed of the shaft. Each vector of sensor data corresponding to one revolution of the shaft may be "resampled" (i.e., interpolated) to generate vectors of resampled sensor data that all have the same number of samples, (e.g., n). The vectors of resampled sensor data may then be averaged to produce Signal Average, i.e., a vector of averaged resampled sensor data. Accordingly, the averaged resampled sensor data is synchronous with the shaft and/or gear and not dependent on varying load and/or RPM. In other words, shaft and/or gear vibration data are generally synchronous with shaft RPM and TSA is configured to maintain this in the averaged vibration data and reduce the likelihood of spreading spectral energy into adjacent bins for, e.g., gear mesh.

Figure 12:
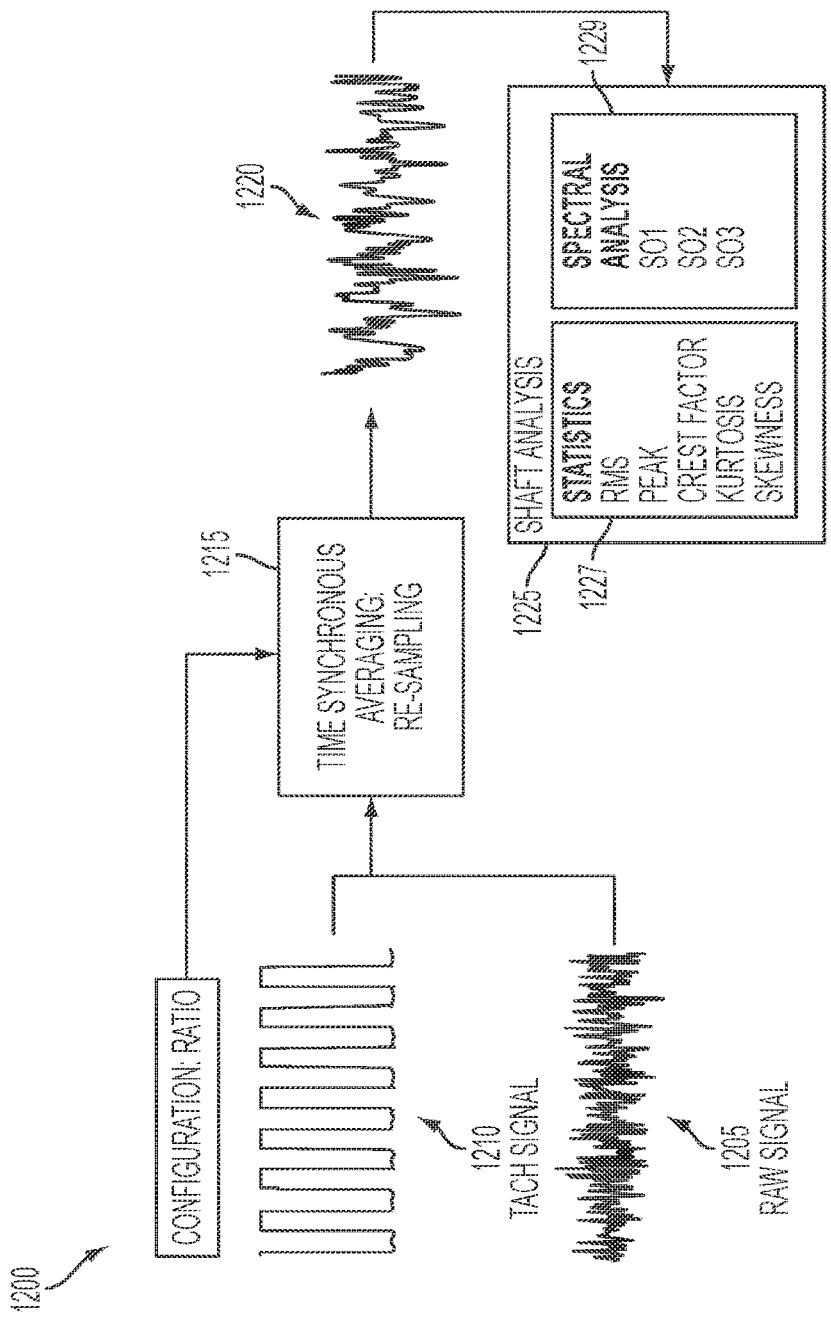
FIG. 12 is a graphical flow diagram illustrating shaft analysis, including TSA, consistent with the present disclosure.

FIG. 12 is a graphical flow diagram 1200 illustrating shaft analysis, including TSA. CAM sensor output data (Raw Signal) 1205 may be averaged 1215 using time synchronous averaging and CAT output data (Tach Signal) 1210, i.e., vector of zero crossings. The vector of averaged resampled sensor data 1220 may then be analyzed 1225, determinisitically 1229 and/or statistically 1227, as described herein.

Residual Algorithm. A residual, or difference signal, is a technique used to improve a signal to noise ratio of a fault signal by removing strong tones. The residual operates on the Signal Average (SA), e.g., TSA, and may be sensitive to faults identified with gears on the shaft from which the SA is generated. For example, a (first) residual may be calculated as follows. A frequency spectrum of the SA may be performed, e.g., an FFT (fast Fourier transform) may be performed on the averaged signal from the sensor monitoring a particular component, e.g., gear: FSA=fft(SA). A mean value and standard deviation may then be calculated using an absolute value of the FFT of the averaged signal: aFSA=abs(FSA), mFSA=mean(aFSA), sFSA=RMS(aFSA). A threshold (T) for the strong tones may then be determined based on the mean value and standard deviation of the FFT of the averaged signal: T=mFSA+2*sFSA. Spectral values with aFSA>T may then be set to zero. The residual may then be an inverse fast Fourier transform of the resulting spectrum.

An Energy Operator (EO) is a measure of an autocorrelation of the SA. For example, surface roughness and/or a soft and/or cracked tooth may have a relatively low autocorrelation: for i=1: n−1 $EO_i = SA_i \times SA_i - SA_{i-1} \times SA_{i+1}$. SA is a vector of averaged sensor data and $SA_i$ is the $i^{th}$ element in the SA vector.

A Narrow Band signal is a type of residual signal (e.g., a second residual) where tones (i.e., frequencies) not associated with a gear mesh may be removed. A bandwidth of the narrow band signal corresponds to a number of gear mesh bins on either side of the gear mesh that are not removed. Statistics of the narrow band signal may provide an indication of, (i.e., may represent) a soft and/or cracked tooth.

An Amplitude Modulation (AM) of a gear corresponds to an absolute value of a Hilbert transform of the narrowband signal. Statistics of the narrow band signal may provide an indication of, (i.e., may represent) a soft and/or cracked tooth.

A Frequency Modulation (FM) of a gear corresponds to a normalized angle of the Hilbert transform of the narrowband signal. For some gears architectures, the frequency modulation may be more sensitive than the amplitude modulation.

A Figure of Merit algorithm may be used to detect gear wear. The Figure of Merit corresponds to a ratio of a second harmonic gear mesh tone to the gear mesh tone.

A sideband modulation algorithm may be to detect gear misalignment. While misalignment may not be considered a gear fault, continued operation in a misaligned state increases tooth contact load and may eventually lead to premature gear failure. Relatively large sideband modulation values may be an indicator of improper transmission build up and/or an indicator that a transmission band has shifted, which maintenance may correct.

A G2 analysis may be sensitive to a soft and/or cracked gear tooth. It is a ratio of an SA Peak to peak value and the gear mesh tone.

Figure 13:
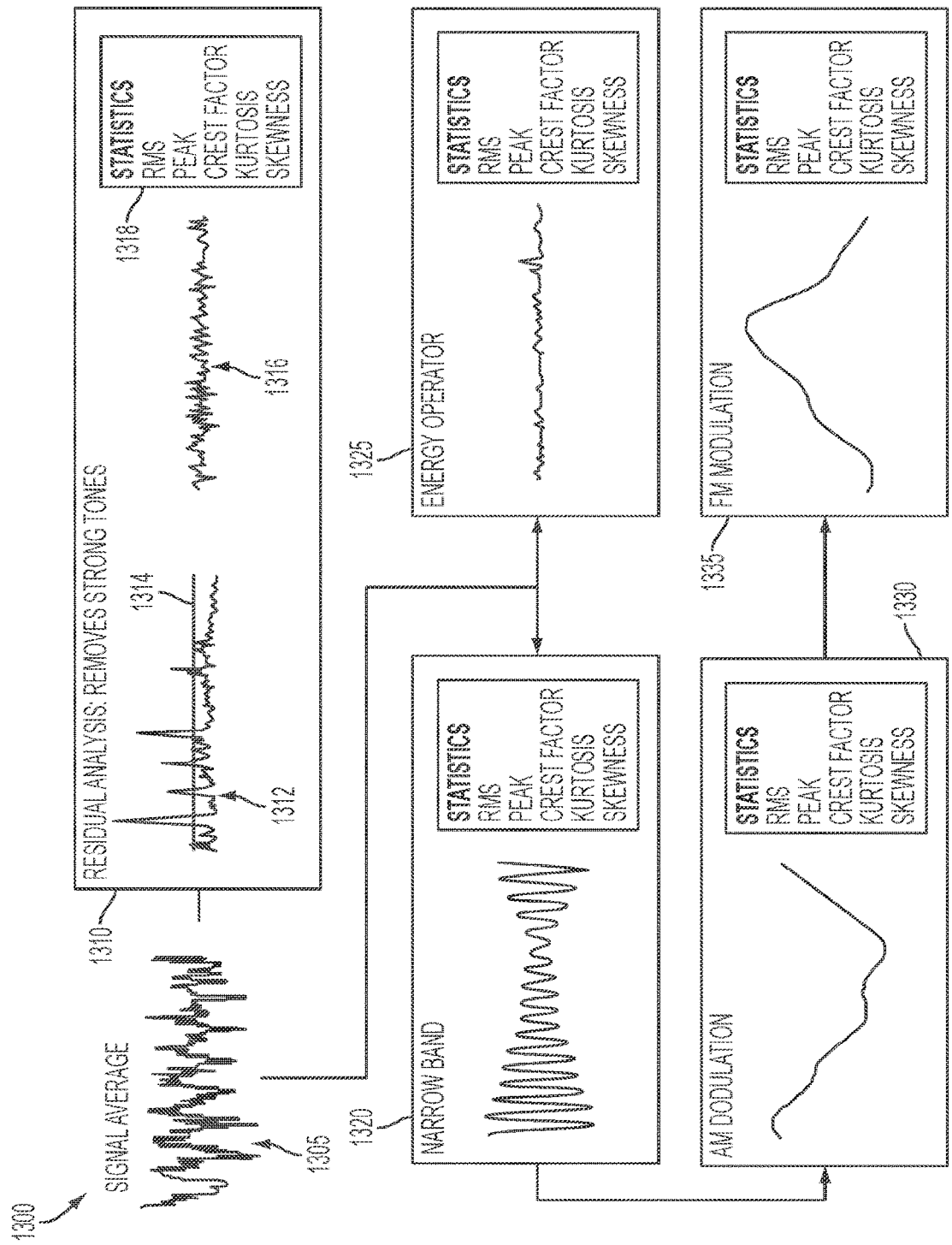
FIG. 13 is a flow diagram illustrating gear fault processing consistent with the present disclosure.

FIG. 13 is a flow diagram 1300 illustrating gear fault processing. The flow diagram 1300 illustrates graphically an average signal (Signal Average) 1305, an effects of the deterministic analyses, described herein. "Averaged Signal" corresponds to a vector of data that includes a number of averaged values of sensor output data. The waveforms illustrated in FIG. 13 are versus time (and/or sample), unless otherwise rioted. A frequency spectrum 1312 of Signal Average 11305 shows five harmonics that exceed a threshold 1314. A residual 1316, i.e., resulting signal, with the five harmonics removed may then be processed using statistical analyses 1318, (i.e., statistics may be determined for the residual). Narrow Band signal 1320 illustrates Signal Average 1305 with harmonics outside a narrow band removed. Energy Operator 1325 illustrates a measure of autocorrelation of Signal Average 1305. Narrow Band may be further processed, as described herein, to yield an AM modulation signal 1330 and/or an FM modulation signal 1335. Statistics corresponding to Statistics 1318 may their be determined for the resultant signals (i.e., vectors of data) of the deterministic analyses.

For example (continuing with the wind turbine example), gear sensor data may be generally synchronous with the shaft. Bearing sensor data may not be synchronous with the shaft. Bearing component movement may not be an integer order (i.e., multiple) of shaft RPM and, at times, there may be slippage. Accordingly, the flow chart 1100 of FIG. 11 may be applied first to the shaft as illustrated in FIG. 12. The TSA of shaft vibration data may be determined. The resulting vector of data corresponds to synchronous "noise" associated with the shaft. Statistical analyses may then be performed on the shaft TSA vector of data. Performing the FFT on the shaft TSA vector of data yields a frequency spectrum. The first, second and third frequency bins of the spectrum then correspond to the first, second and third shaft order, respectively.

For gear analysis, illustrated in FIG. 13, a gear TSA vector of data is determined based on the shaft RPM and gear CAM data, for each gear on the shaft. Residual, energy operator, narrow band, AM modulation and/or FM modulation may then be determined for each gear TSA vector of data. Bearing analysis differs from gear analysis. Bearing sensor data is typically not synchronous with the shaft. For example, bearing component rates may be an integer order (i.e., multiple) of shaft RPM and/or there may be some slippage. Bearing analysis may be based at least in part on demodulation (e.g., detecting bearing resonance due to impact from a fault). "Resonance" corresponds to "ringing", i.e., oscillation at a natural frequency of a component. The natural frequenc(ies) may depend on bearing material, size and/or other bearing properties known to those skilled in the art. For example, the natural frequency of a bearing may be in a range of 20 kHz to 25 kHz while the natural frequency of a larger bearing may be in the range of 2 kHz to 3.5 kHz or 10 kHz to 11.5 kHz, depending on bearing material, size, etc.

Demodulation is used because bearing fault energies may be significantly smaller than shaft or gear energies. For example, a shaft fault may result in a shaft order 1 in a range of 1 g to 5 gs. (1 g corresponds to the acceleration of gravity at the earth's surface i.e., 9.80665 m/s$^2$, 5 gs corresponds to five times the acceleration of gravity at the earth's surface, i.e., the parameter an accelerometer is configured to detect) while a misaligned gear may result in vibration energy in a range of 50 gs to 100 gs. A bearing fault may only result in a first bin spectral energy of 10 g, in other words, a bearing may have at least one natural frequency ("resonant frequency") based at least in part on the bearing material, e.g., material stiffness and/or mass. A bearing impact may result in a modulation by this natural frequency. The modulating natural frequency may be detected (sensor data) by, e.g., a CAM (vibration sensor, accelerometer sensor module). Bearing envelope analysis is configured to demodulate the modulating natural frequency to find the modulated signal, i.e., spectrum near the natural frequency. Demodulation may be performed without a priori knowledge of the natural frequency of the bearing.

Bearing Envelope Analysis (BEA) is based on demodulation of high frequency resonance (i.e., "ringing") that may be associated with bearing element impacts. High frequency resonance corresponds to a natural frequency of the bearing. For example, for rolling element bearings, when the rolling elements strike a local fault on an inner or outer race, or a fault on a rolling element strikes the inner or outer race, an impact may be produced. These impacts may modulate a signal at associated bearing pass frequencies, such as: Cage Pass Frequency (CPF), Ball Pass Frequency Outer Race (BPFO), Ball Pass Frequency Inner Race (BPFI), and Ball Fault Frequency (BFF). This periodic modulation may increase an envelope RMS. Mathematically, the modulation may be described as: $\cos(a)\cdot\cos(b)=\frac{1}{2}[\cos(a+b)+\cos(a-b)]$.

This periodic modulation corresponds to amplitude modulation of a bearing rate (a) with a high frequency carrier signal (resonant frequency (b)) resulting in sidebands in the spectrum surrounding the resonant frequency. It may be difficult to distinguish the exact frequency of the resonance. The resonant frequency may not be known a priori and may be relatively difficult to determine. However, demodulation techniques typically do not need to know the exact frequency. The BEA is configured to multiply the vibration signal (i.e., bearing sensor data) by a relatively high frequency, complex signal centered at a hypothesized resonant frequency (e.g., 22.5 KHz). The result may then be low pass filtered to remove the high frequency image, decimated, and the spectral power density may then be estimated:

$$\cos(b)\cdot\cos(a+b)=\frac{1}{2}[\cos(a+b+b)+\cos(a+b-b)]\rightarrow$$
$$H(\omega)\rightarrow\cos(a)$$

Generally, BEA is performed at frequencies higher than the shaft and/or gear mesh tones. Shaft tones correspond to fundamental frequency and harmonics of the transform, e.g., FFT of the TSA of the shaft sensor data. A gear mesh tone is a harmonic of the shaft fundamental frequency, i.e., is synchronous with the shaft. The gear mesh tone may itself include gear mesh harmonics. The fundamental frequency of the gear mesh tone may correspond to the fundamental frequency of the shaft multiplied by the number of teeth in the gear. Misalignment may result in side bands, i.e., the shaft may modulate the gear.

(Fundamental Frequency of the Shaft Corresponds to the Fundamental Frequency of the FFT of the TSA of the Shaft Sensor Data.)

Performing BEA at these higher frequencies is configured to ensure that the demodulated bearing tones are not masked by the other rotating sources, such as shaft and gear mesh, which are present at CPF, BPFO, BPFI and BFF frequencies. Shaft order amplitudes of 0.1 g and gear mesh amplitudes of 10's of gs, are common. In contrast, damaged bearing amplitudes may be 0.001 g, i.e., orders of magnitude smaller.

For BEA, the bearing rates may be calculated as:

$$\text{Cage Pass Frequency}(CPF): \frac{f}{2}\left(1 - \frac{d}{e} \times \cos(\beta)\right)$$

$$\text{Ball Pass Frequency Inner Race }(BPFI): \frac{b \times f}{2}\left(1 + \frac{d}{e} \times \cos(\beta)\right)$$

$$\text{Ball Pass Frequency Outer Race }(BPFO): \frac{b \times f}{2}\left(1 - \frac{d}{e} \times \cos(\beta)\right)$$

$$\text{Ball Fault Frequency}(BFF): \frac{e \times f}{d}\left(1 - \left(\frac{d}{e}\right)^2 \times \cos^2(\beta)\right)$$

where,
f is the driving frequency,
b is the number of rolling elements,
d is the ball bearing diameter,
e is the bearing pitch diameter, and
β is the bearing contact angle.

Figure 14:
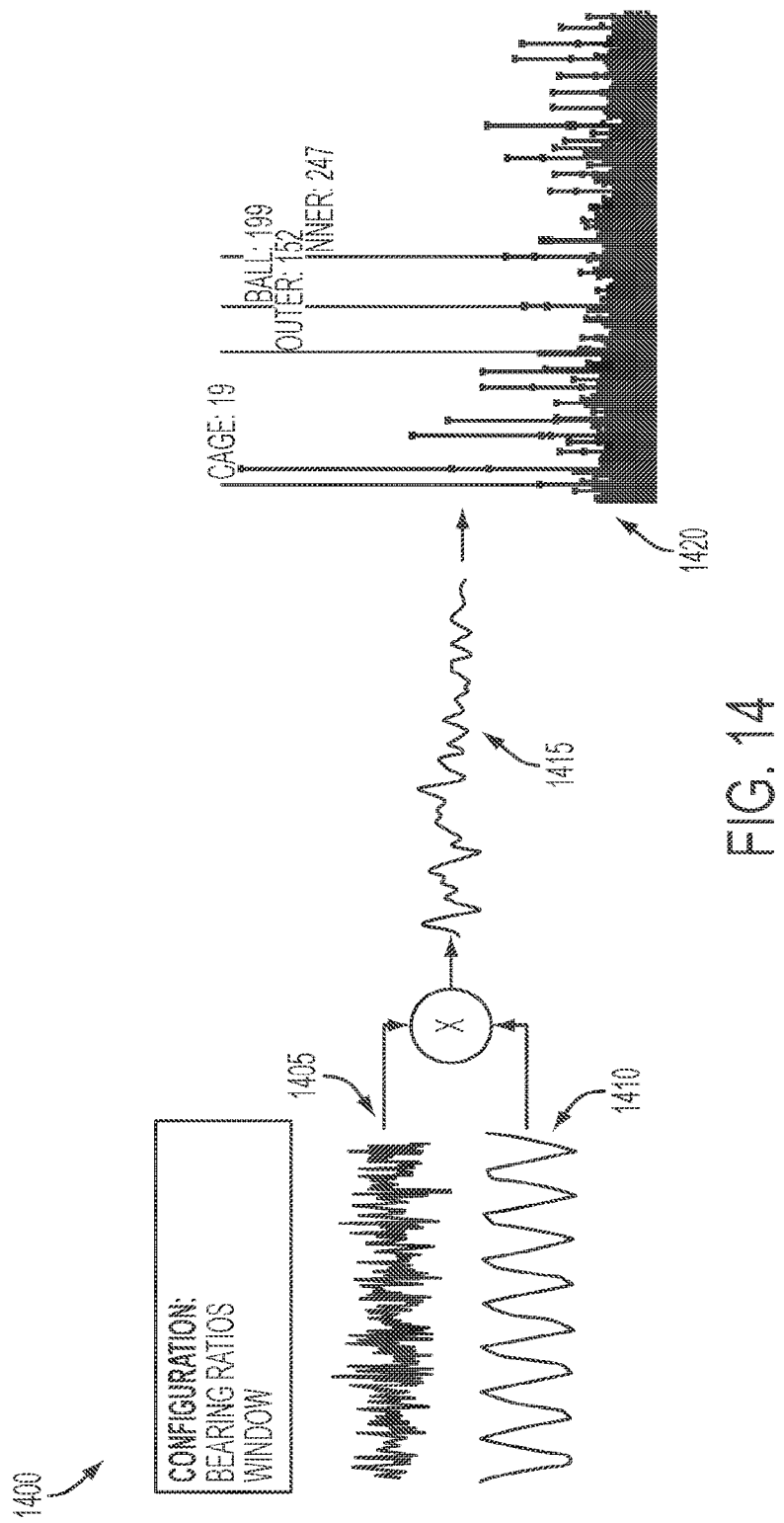
FIG. 14 is an example of Bearing Envelope Analysis consistent with the present disclosure.

FIG. 14 is an example of Bearing Envelope Analysis 1400. Bearing sensor data 1405 may be demodulated (i.e., multiplied by) with a hypothesized resonant frequency 1410, as described herein. The demodulated signal 1415 may then be filtered and decimated. Power spectral density 1420 may then be estimated.

Accordingly, Condition Indicators for monitored components, e.g., shaft(s), gear(s) and/or bearing(s) may be determined based, at least in part, on acquired sensor data. The Condition indicators may be determined based on statistical analyses and/or deterministic analyses, as described herein.

In some embodiments, Condition Indicators associated with the sensors themselves may be determined.

For example, for an accelerometer, relatively large change in a least significant bit (e.g., a change in gain) may indicate that a mounting of the sensor module and/or accelerometer is loose (e.g., degraded transfer function) and/or no power is being supplied to the accelerometer. Other accelerometer condition indicators may include: A Low Frequency Slope and Intercept. The Low Frequency Slope and Intercept are least squares error fits of a logarithm of a low frequency accelerometer spectrum. A change in these values over time may represent a change in DC bias voltage provided to the accelerometer, indicating sensor failure. An additional CI for an accelerometer is a built in test of the accelerometer itself. For example, the ADXL001 is configured to allow voltage to be applied that simulates a high-G condition. A change in an output of the Built in Test may indicate a failure of the accelerometer.

As described herein, acquired sensor data may be analyzed by a server and/or by an associated sensor module. Whether the sensor module is capable of performing the analysis and/or an amount of time to perform the analysis may depend on processing capability of the associated controller.

One factor that may facilitate local processing on a microcontroller (i.e., in a sensor module) is a Fast Fourier Transform (FM that does not call transcendental functions (e.g., sine and cosine). A transcendental function cannot be expressed in terms of a finite sequence of the algebraic operations of addition, subtraction, multiplication and root extraction. The Atmel AT32UC3C0512 has an FPU (floating point unit) which is configured to perform native (i.e., in hardware) floating point operations for addition, multiplication, subtraction and square root. Since most CI analyses include performing an FFT (i.e., generating a frequency spectrum), an FFT algorithm configured to be performed on the FPU natively results in the ability to process more data. In other words, utilizing the FPU to perform the FFT may result in faster processing and therefore a relatively shorter processing time. For example, test results using the AT32UC3C0512 microcontroller indicate a 5× increase in speed when processing natively vs. emulation (emulation may be used when the FPU cannot process natively, i.e., may be performed in software).

An FFT may be performed natively, without calculating transcendental functions, using a "look up" table for the sine and cosine function. Some implementations of look up tables used for performing and FFT are configured to call the sine and cosine function prior to execution of the FFT. In other words the sine and cosine functions are called, and the lookup tables are generated, at runtime. In the implementation described herein, the lookup table is part of a FFT function call header. In other words, the lookup table is generated prior to run time.

This is possible because, fundamentally, the FFT repeats the call of angles. A number of angles called for a radix 2 FFT is $\log_2$(number of points)+1. Thus, a 1024 point FFT may use only 10+1 or eleven angles. For 32,768 point FFT, only 16 angles may be used. The angle is $2\pi$ divided by block size. Block size iterates from 2 to number of points in the FFT by powers of 2 (e.g. $\log_2$(max length), . . . 2048, 1024, 512, 256, 128, 64, 16, 4). Thus, this structure allows one array for sine and one array for cosine to be defined to represent all possible angles that may be used for the FFT. These arrays may then be defined prior to run time. The elements (i.e., contents) of the array are the sine of ($2\pi$/(block size)) and cosine of ($2\pi$/(block size)), respectively. An index into the array is a maximum number of bits (e.g., for 32,768 a integer value of 15)—minus the current bit, starting at 0. Each iteration through the FFT algorithm may then increase the number of bits by 1.

An example of the pseudo code for the FFT algorithm is:

```
for ( BlockSize = 2; BlockSize <= NumSamples; BlockSize <<= 1 ){
    idx = MXBIT - crtBit;//current index into cos/sin table
    idx1 = idx + 1;
    cm1 = cosLU(idx);
    cm2 = cosLU(idx1);
    sm1 = -sinLU(idx);
    sm2 = -sinLU(idx1);
    w = 2.0f * cm1;
    for ( i=0; i < NumSamples; i += BlockSize ) {//do the FFT
        ar[2] = cm2; ar[1] = cm1;
        ai[2] = sm2; ai[1] = sm1;
        for ( j=i, n=0; n < BlockEnd; j++, n++ ){
            ar[0] = w*ar[1] - ar[2];
            ar[2] = ar[1]; ar[1] = ar[0];
            ai[0] = w*ai[1] - ai[2];
            ai[2] = ai[1]; ai[1] = ai[0];
            k = j + BlockEnd;
            tr = ar[0]*RealOut[k] - ai[0]*ImagOut[k];
            ti = ar[0]*ImagOut[k] + ai[0]*RealOut[k];
            RealOut[k] = RealOut[j] - tr;
            ImagOut[k] = ImagOut[j] - ti;
            RealOut[j] += tr;
            ImagOut[j] += ti;
        }
    }
    crtBit++;
    BlockEnd = BlockSize;
}
```

Accordingly, a sine or a cosine of an angle may be determined at run time by retrieving a value from a lookup table. Calculation of an FFT may then not include evaluating transcendental functions at run time.

A number of CIs are configured to call the FFT using real data. Computational complexity may be further reduced by taking advantage of the FFT symmetry (e.g., negative frequencies are the complex conjugates of positive frequencies). In this case, the FFT may be called with even values of the time domain signal (e.g., TSA of sensor data) as the real signal, and the odd values of the time domain signal as the imaginary signal. The Real FFT (i.e., the FFT for real data) includes an additional manipulation to reorder the FFT data. A lookup table FFT may be called on half the data and a final FFT stage may process and reorder the data to correct for a lack of symmetry (i.e., no negative frequencies). A time to perform a real FFT, as described herein, may be on the order $\frac{1}{2}*\log_2(n/2))/(\log_2(n))$, i.e., approximately 0.4× the time to perform a regular (i.e., complex) FFT. An example pseudo code is:

```
n2 = NumSamples/2;
nbit = NumberOfBitsNeeded(NumSamples) + 1;   //Initialize the recurance algorithm for sin/cos: get theta angle
wtemp = sinLU(MXBIT - nbit);
wpi = sinLU(MXBIT - nbit + 1);
c2 = -0.5f;
FFTLU(NumSamples, 0, RO, IO)        //call the FFT
```

```
wpr = -2.0f*wtemp*wtemp;        //recurance
wr = 1.0f+wpr;
wi = wpi;
c1 = 0.5f;
np3 = NumSamples;        to c
for (i=1; i <= n2; i++)
{
        i1 = i;
        i3 = np3 - i;
                                 //conjugate side
        h1r = c1 * ( RO[i1] + RO[i3] );    //The two separate transforms are
        h1i = c1 * ( IO[i1] - IO[i3] );    //separated out of data.
        h2r = -c2 * ( IO[i1] + IO[i3 ]);
        h2i = c2 * (RO[i1] - RO[i3]);
        RO[i1] = h1r - wr*h2r - wi*h2i;    //Here they are recombined to form
        IO[i1] = h1i - wr*h2i + wi*h2r;    //the true transform of the original real data.
        RO[i3] = h1r + wr*h2r + wi*h2i;    //e.g. the butterfly operation
        IO[i3] = -h1i - wr*h2i + wi*h2r;
        wtemp = wr;
        wr = wtemp*wpr - wi*wpi + wr;     //The recurrence: advances the angle by theta
        wi = wi*wpr + wtemp*wpi + wi;
}
h1r = RO[0];
RO[0] = h1r - IO[0];    //Squeeze the first and last data together
IO[0] = -h1r - IO[0];   //to get them all within the original array.
```

Accordingly, the methodology for determining an FFT of a vector of data that excludes calculation transcendental functions at run time and/or exploits symmetry in the FFT, facilitates analyzing sensor data in the sensor modules.

As described herein, Condition Indicators may be based, at least in part, on statistical analyses and/or deterministic analyses of acquired sensor output data. Condition Indicators may be component-specific. In other words, the particular Condition Indicators to be utilized may depend on the component being monitored. For monitored equipment that includes shaft(s), gear(s) and/or bearing(s), a respective set of Condition Indicators may be selected for each component type.

Shaft CIs may include: Number of Revolutions Sampled, Number of Points in the FFT, Signal Average (e.g., TSA of shaft sensor vector of data) RMS, Signal Average Peak 2 Peak, Signal Average Crest Factor, Shaft Order 1, Shaft Order 2, and/or Shaft Order 3.

Gear CI may include: Residual RMS where the residual signal is the Signal Average with the strong tones (i.e., frequency bins with energy above a threshold) removed. Residual RMS may be calculated by taking the inverse FFT of the SA spectrum, where spectrum values greater than two standard deviations from the mean have been set to zero. Gear CI may further include: Residual Kurtosis, Residual Crest Factor, Energy Ratio, Energy Operator RMS, Energy Operator Kurtosis, Energy Operator CF, Figure of Merit 0, Sideband Modulation, G2 Analysis, Narrowband RMS, Narrowband Kurtosis, Narrowband Crest Factor, Amplitude Modulation Kurtosis, Derivative Amplitude Modulation Kurtosis, Frequency Modulation Kurtosis, and/or Derivative Frequency Modulation Kurtosis.

Bearing CI may include: Envelope Cage Energy, Envelope Ball Energy, Envelope Inner Race Energy, Envelope Outer Race Energy, Shaft Tick Energy, Envelope RMS, and/or Half Shaft Energy. For example, a damaged gear may generate an impact signature similar to a bearing fault at one impact per revolution, e.g., a "tick". Worn, e.g., loose, plain and/or roller bearings may generate elevated half-shaft rate (revolution) energies.

Sensor, e.g., accelerometer, CI may include: Accelerometer BIT (i.e., built in test). Accelerometer Gain (most significant bit used), Lower Frequency intercept and/or Lower frequency slope.

In addition to sensor CI, at least some sensor modules may be configured to perform a Built-in-Test (BIT) at or near a defined time interval. For example, an accelerometer sensor module may be configured to verify that the accelerometer and/or interface module components are functioning properly to ensure quality data acquisitions. Memory may also be tested.

Alerting Methodology

Successful deployment of a condition monitoring system depends at least in part on alerting when a component is degrading, i.e., alerting when the component is no longer good and before the component is bad. This includes setting a threshold for a given condition indicator (CI) and/or a combination of CI representing component health (i.e., health indicator (HI)) such that when the threshold is crossed, actionable maintenance is performed. Setting such a threshold may be relatively difficult because of measurement variance associated with a given component as well as between unit variance for the given component. In setting such a threshold, it is desirable to account for this variance, to set the threshold high enough to not be overly sensitive to false alarms (e.g., indicating that a component is bad when the component is actually good) and to set the threshold low enough to avoid not detecting a fault (e.g., being insensitive to a fault, i.e., a missed detection).

A methodology for setting such a threshold depends on data that may be available a priori as a basis for determining that a component is no longer good. For example, an OEM (original equipment manufacturer) may provide a limit on a parameter and/or CI for a particular component. In a second example, service history and/or historic data may be utilized. For example, a rising trend may be recognized on, e.g., shaft order 3. Evaluation of the associated component may then discover a cracked coupling. Based on this, a threshold may be set on shaft order 3 so that a rising trend is configured to trigger an alert.

In a third example, the OEM may not provide a limit and there may be no service history or historic data. In other words, there may be no recognized or defined indicator for detecting a "bad" component. In this example, the threshold may be set statistically based on known good components. The threshold is configured to trigger an alert for a monitored component that may no longer be good (preferably before the component is bad).

Nominal condition indicators may be determined a priori. For example, sensor data may be acquired for a number of known good components ("nominal component data") and nominal condition indicators may then be determined based at least in part on the acquired sensor data. For example, vibration data may be acquired from a number of known good components and the condition indicators may then be determined based on the acquired vibration data for the known good components. Condition indicators may also be determined on "processed" sensor data, e.g., data that may be based, at least in part, on acquired sensor data, as described herein. Monitored component condition indicators may be determined based, at least in part, on acquired sensor data for the monitored component ("monitored component data"). Nominal component data may be used to generate a threshold for classifying a monitored component as no longer good, as described herein.

Generally, Health Indicators (HIs) include a combination of Condition Indicators. For example, a Health indicator HI may be a function of some number of CIs. Functions include: a sum of CIs (e.g., HI=CI1+CI2+CI3), an order statistic, i.e., a maximum of a number of CIs (e.g., HI=max (CI1, CI2, CI3)), a square root of a sum of squares of CIs (e.g., HI=sqrt($CI1^2+CI2^2+CI3^2$)). Determining a threshold for a function of a probability distribution (e.g., CIs) may be more straightforward if the CIs are independent (i.e., uncorrelated), identical distributions. Typically, CIs are not independent, they are correlated. When probability distributions are correlated, the joint probability distribution function is not equal to a product of the individual probability distribution functions, i.e, $p(x,y) \neq p(x)*p(y)$.

In some cases, threshold setting may be a rather ad hoc process. In a first example, a threshold may be set that corresponds to three standard deviations away from a mean of a distribution of a CI for known good components. This threshold may only be valid for one CI (i.e., not a combination of CIs). If the CI has a Gaussian (Normal) distribution, a threshold corresponding to three standard deviations implies a false alarm rate of 1e-3. In a second example, for generation of a health indicator (HI) the probability of false alarm may sometimes be ignored. For example, the HI may be defined as the maximum normalized CI of a number, n, of normalized CIs. This technique is known as an "order statistics" and is only valid if the CIs are IID (independent and identically distributed random variables). The CIs for a machine are typically highly correlated (i.e., are not independent), meaning that the product of the probability density functions, P(x)*P(y), is not equal to the joint probability density function, P(x,y).

The first ad hoc example may provide a threshold with a constant probability of false alarm but is only for a single CI, i.e., not for a HI that includes a plurality of CI. The second example includes multiple CIs but ignores the probability of false alarm. A constant probability of false alarm and an HI that includes a plurality CIs are desirable for setting "no longer good" thresholds. A constant probability of false alarms (pfa) means that when a CI or HI indicates that a component is no longer good, the probability that the component is actually no longer good is 1-pfa, also a constant. Health Indicators with a plurality of CIs (IID CIs) may provide a more robust indicator of the condition of the component and/or machine.

Techniques exist for "whitening" correlated CIs to produce uncorrelated CIs. For example, U.S. Pat. No. 7,684,936 discloses using an inverse covariance matrix to both normalize and whiten correlated CIs, but this technique is only valid for one type of HI function.

Other methods for whitening include a whitening transform using an Eigenvector matrix multiplied by a square root of the Eigenvalues (diagonal matrix). This whiten transform is a non-linear transform: $[\Phi,\Lambda]$=eig, where $\Phi$=eigenvector matrix, and $\Lambda$ is the eigenvalue matrix. $A=\Lambda^{1/2}\Phi^T$ defines the whitening transform, and effectively creates new random variables that are uncorrelated and have the same variances as the original random variables. However, this is a nonlinear transform and the distribution of the original CI is not preserved making it inappropriate for threshold setting.

A Cholesky Decomposition of Hermitian, positive definite matrix results in $A=LL^*$, where A is the Hermitian, positive definite matrix, L is a lower triangular, and $L^*$ is its conjugate transpose. The inverse covariance matrix, $\Sigma^{-1}$, by definition, is positive definite Hermitian. Accordingly, $LL^*=\Sigma^{-1}$ and $CI^TL=K$, where K is 2 to n independent CIs without changing their distributions. The variance of K values of the vector K are 1. The distributions (i.e., probability density functions) of the independent CIs are identical for Rayleigh distributed CIs (i.e., CIs having Rayleigh probability density functions). The distributions of the independent CIs can be made identical by applying the appropriate mean offset (e.g. mi) for Gaussian distributed CIs. This technique may be applied to CIs with Rayleigh distributions (e.g. magnitude CIs) and/or CIs with tailed distribution similar to Rayleigh.

For example, most CIs for the shaft(s), gear(s) and bearing(s), described herein, are not Gaussian but a few may be near Gaussian. Magnitudes, e.g., shaft order and/or spectrum, of a nominal component is typically Rayleigh distributed. Gear CIs that are neither Rayleigh nor Gaussian, may be tailed, i.e., similar to Rayleigh but including an offset. For these tailed CIs, the offset may be removed (linearly), then the resulting CI may be treated as Rayleigh.

Advantageously, this technique allows for a number of HI functions because the CIs are now IID. For example, for a Health Indicator HI that includes n condition indicators, a covariance of the CIs may be determined, a priori, e.g., from a sampling of known good components. The inverse covariance may then be determined and L may be determined by applying the Cholesky Decomposition to the inverse covariance. The inverse covariance and L are also determined a priori.

Sensor data may then be acquired for the monitored component. The n condition indicators may then be determined based on the acquired sensor data. Using the matrix L, determined a priori, a matrix $K=CI^TL$ may be determined where $CI^T$ is a transpose of a vector of condition indicators used in the HI function. K is then a vector of n independent condition indicators with unchanged distributions. In other words, K may then be used for threshold analysis for determining good versus no longer good for a monitored component.

Thresholds may be determined for a number of health indicators that are functions of n condition indicators using the Cholesky decomposition and the covariance associated with the statistical analysis of known good components. A corrected Health indicator may be determined for Order Statistic, Sum of CIs and/or normalized energy of CI, where the corrected Health Indicator corresponds to the thresholds determined a priori and is based on whitened (i.e., independent, identically distributed) CIs. For example, the threshold based on the known good component CI statistics may be chosen to be 0.5 on a scale of 0 to 1 where 1 corresponds to component bad and 0.5 is considered nominal. A "corrected" HI may then be determined that is a function of K (the vector of independent CIs) and the nominal threshold determined a priori.

The "corrected" HI may be scaled so that an HI of 0.5 corresponds to a threshold between nominal (i.e., "good") and no longer good. For example, an HI in a range of 0 to 0.5 may be considered nominal, in a range of 0.5 to 0.75 may be considered out of tolerance but still serviceable (i.e., no longer good but not yet bad), in a range of 0.75 to 1.0 may indicate that maintenance should be scheduled and an HI greater than 1.0 may indicate that continued operation could result in component failure and collateral damage (i.e., bad). In this manner, scaled and corrected His are configured to provide a common reference and indication of a component that is no longer good so that maintenance may be scheduled before the component fails (i.e., is bad).

Corrected Order Statistic (HI=maximum CI): Using this property of the inverse covariance matrix, a corrected Order Statistic may be calculated as follows.

The Order Statistic (OS) probability density function (PDF) is: $g(x)=n[F(x)]^{n-1} f(x)$ where n is the number of CIs, F(x) is the cumulative distribution function, $f(x)$ is the probability density function, and g(x) is the corrected order statistic probability density function.

$f(x)=x/\beta^2 \exp(-x/2\beta^2)$ (i.e., Rayleigh PDF) and $F(x)=1-\exp(-x^2/2\beta^2)$ (i.e., Rayleigh CDF).

Using the equation for the order statistic probability density function g(x), the OS PDF is $f(x)=3[1-\exp(-x^2/\beta^2)]^2 x/\beta^2 \exp(-x^2/2\beta^2)$.

The inverse CDF may be found numerically. For example, the inverse CDF may be found by setting a lower bound at 5% and the upper bound (i.e., threshold for a probability of false alarm at 10e−3), with the threshold set at 0.5 on a 0 to 1 scale (1 corresponds to component bad, 0.5 corresponds to nominal)

$K=CI^T L$, HI=max(K)*t, where the threshold t=0.1078.

Corrected Sum of CI (HI=SUM(CI)): Using this property of the inverse covariance matrix, a corrected Sum of CI may be calculated as follows.

$K=CI^T L, S=\text{sum}(K)$.

The mean of the S=n*1/sqrt(2-pi/2) and the variance is n.

The PDF can be shown to be Nakagami with parameters $\mu=E^2[X^2]/\text{Var}[X^2]$ and $\omega=E[X^2]$. For a Nakagami PDF, the parameter μ corresponds to a shape of the PDF and the parameter to corresponds to spread of the PDF.

For a given μ and ω, the inverse Nakagami CDF may be used to calculate the threshold, which for n=3 CIs is 10.125. The value t=0.5/10.125=0.0494, $HI=S*t$.

Normalized Energy of the CI (HI=norm (CI)). Normalized energy corresponds to the square root of the sum of the squares of the CIs.

$K=CI^T L, S=\text{norm}(K)$.

This again can be shown to be Nakagami, but with mean of S=2*n*1/sqrt(2-pi/2);

$\omega=1/(2-\pi/2)*2*n$ and μ is found to be n.

For a given μ and ω, the inverse Nakagami CDF may be used to calculate the threshold, which for n=3 CIs is 6.2586, and t=0.5/6.2586=0.0799

$HI=S*t$

Advantageously, using the Cholesky decomposition to find the square root of the matrix allows a significantly broader selection of HI algorithms available for evaluating a condition of the machine being monitored. The corrected HI above were configured for CI's with Rayleigh PDFs. The Cholesky decomposition technique may be similarly applied to Gaussian distributions. For the Gaussian case:

Corrected Order Statistic:

OS PDF is: $g(x)=n[F(x)]^{n-1} f(x)$ $f(x)=x/\sigma\sqrt{2\pi} \exp(-(x-\mu)^2/2\sigma^2)$ (i.e., Gaussian PDF) and $F(x)=x/\sigma\sqrt{2\pi} \int_{-\infty}^{x} \exp(-(t-\mu)^2/2\sigma^2)dt$ (i.e., Gaussian CDF).

Now the OS PDF is $f(x)=$ $3\left[x/\sigma\sqrt{2\pi} \int_{-\infty}^{x} \exp(-(t-\mu)^2/2\sigma^2)dt\right]^2 x/\sigma\sqrt{2\pi} \exp(-(x-\mu)^2/2\sigma^2)$ Similar to the Rayleigh case, described herein, the inverse CDF may be found numerically.

$K=CI^T L, HI=\max(K)*t$,

Corrected Sum of CI:

$K=CI^T L, S=\text{sum}(K)$.

The mean of $S=\Sigma_{i=1}^{n} E[K_i]$; The variance is n.

The PDF can be shown to be Gaussian with parameters $\mu=\Sigma_{i=1}^{n} E[K_i]$ and $\sigma=\sqrt{n}$ For a given μ and σ, the inverse normal CDF may be used to calculate threshold, which for n=3 CIs is means of 3, 2, 1 respectively is t=0.5/10.029=0.05, $HI=S*t$.

Normalized Energy of the CI $K=CI^T L, S=\text{norm}(K)$.

This again can be shown to be Nakagami, but with mean of S=2*n*1/sqrt(2-pi/2);

$\omega=n$ and μ is ω/2.

For a given μ and ω, the inverse Nakagami CDF may be used to calculate the threshold, which for n=3 CIs is 3.3682, and t=0.5/3.3682=0.1484

$HI=S*t$.

Empirical CDF: In this example, a sample population may be used to estimate the CDF empirically. For example, for 10,000 samples, taken for, e.g., 20 articles, a threshold for a probability of false alarm (pfa) of $10^{-3}$ may be found by sorting the calculated HI, and setting t the $10^{th}$ maximum value (for a pfa of $10^{-3}$, the expectation is with 10,000 samples is that 10 would be false alarms).

Prognostics: Predating the Remaining Useful Life, Validation and Bound on Error

Diagnostics is concerned with detection of a changing condition related to a component failure. Once a changing condition is detected, prognosis may provide the time to failure (remaining useful life or RUL) and an associated confidence in that prediction. This information, RUL and confidence, may be used in different ways by the maintainer and operator.

In general, prognostics may allow rotating equipment to be operated at lower cost by: Opportunistic maintenance practices, Improved Readiness/Reduction in unscheduled, maintenance, Activation of a "just in time" part delivery, A reduction in the overall number of spares and/or Operating the rotating machinery (e.g., turbine) in a conservative manner to reduce the chance of failure. A prognostic may provide a future state and tradeoff of life under different loads. By operating under less stressful loads, the life of a component may be extended until maintenance can be performed.

Bearing manufactures have used an L10 life calculation for the design of bearings. Similarly, manufactures of gears/shafts have used sample material to determine the modules of material strength, and in general, design such that the maximum load is less than 30% of yield strength (infinite life). An Extended Kalman filter may be used to reconstruct the remaining useful life. A particle filter method may be to estimate the remaining useful life.

The extended Kalman filter (EKF) method is a Taylor series approximation to non-linear system dynamics. The particle filter (PF) method is able to estimate non-linear dynamics better than a EKF method, but is computationally expensive (i.e., PF is a Monte Carlo technique, requirement taking the average of N Kalman filters).

Neither the EKF or PF techniques include a method for validating their performance. In other words, the EKF and/or PF techniques may provide an indication of remaining useful life but do not provide a confidence level associated with the remaining useful life (i.e., do not provide an indication of how good the answer is). The PF method is dependent on an estimate of measurement noise probability distribution. There does not appear to be a disclosure of how to estimate this in real time.

The future state, or RUL, is dependent on load. It is desirable to bound the RUL based on current uncertainty in the health state, and future load.

As described herein, an Unscented Kalman filter (UKF) may be used to estimate the RUL. Estimates of two additional states in the UKF (the first and second derivate of the RUL) may be used to validate model performance. Process noise may be estimated using an online method which results in a better estimate of RUL. The forecast of future health (RUL) may be bounded based on system covariance and the distribution of load.

An advantage of the UKF over a KF is that KF assume linear dynamics, and. Gaussian noise. The RUL problem is typically non-linear in its dynamics. EKF allows non-linear dynamics (estimation via Taylor series of the dynamics) and assumes Gaussian noise, but as such, is accurate for only the 1st moment (mean). EKF also requires a differentiable function to describe the dynamics. The inability to estimate accurately the second moment introduces errors in the RUL calculation. UKF is a generally exact model for dynamics for non-linear models with Gaussian noise and does not require a differentiable function, as the UKF is configured to estimate the distribution of the dynamics. The UKF is configured to be accurate, for the Gaussian noise case, for the 1st, 2nd and 3rd moment. Particle filters (PF, which is a Monte Carlo technique) have been used for prognostics using Paris Law. PF, because they are based on Monte Carlo techniques, require large numbers of simulation which is computationally expensive, perhaps by an order of 100. The performance between the PF and UKF is expected to be similar for Gaussian noise.

The UKF model is a five state model: Health (HI), D, RUL, dRUL/dt and $d^2RUL/dt^2$. There is no calculation of dHI/dt as is done in the EKF. KF, EKF and Markov process are not used.

The UKF uses Paris Law, which governs the rate of crack growth (i.e., fault growth model) in a homogenous material, $$\text{Paris Law: } da/dN = D(\Delta K)^m \quad (1)$$

where
da/dN is the rate of change of the half crack length
D is a material constant of the crack growth equation
$\Delta K$ is the range of the K during a fatigue cycle
m is the exponent of the crack growth equation
The range of strain, $\Delta K$ is given as:

$$\Delta K = 2\sigma\alpha(\pi a)^{1/2} \quad (2)$$

where
$\sigma$ is gross strain
$\alpha$ is a geometric correction factor
a is the half crack length The variables which drive the Paris Law are specific to a given material and test article. In practice, the variables are unknown. Simplifying assumptions may be made to facilitate analysis. For many components/material, the crack growth exponent is 2. The geometric correction factor $\alpha$, may be set to 1, which allows equation. (1) to be reduced to:

$$da/dN = D(4\sigma^2 \pi a) \quad (3)$$

A goal is to determine the number of cycles, N, remaining until a crack length a is reached. Taking the reciprocal of (3) gives:

$$dN/da = 1/D(4\sigma^2 \pi a) \quad (4)$$

Integrating gives the number of cycles (N) remaining. Note that N for synchronous systems (e.g. constant RPM) may be equivalent to time by multiplying with a constant (e.g., 1/RPM).

$$N = \int_{a_o}^{a_f} dN/da \quad (5)$$
$$= \int 1/D(4\sigma^2 \pi a) da$$
$$= 1/D(4\sigma^2 \pi)(\ln(a_f) - \ln(a_o))$$

Equation (5) provides the number of cycles N from the current measured crack $a_o$ to the final crack length $a_f$. The measured component health indicator (HI) may be used as a surrogate for crack length a. Based on a suitable threshold for $a_f$, N may then correspond to the RUL times some constant (e.g., RPM for a synchronous system).

The material crack constant, D, can be estimated as:

$$D = da/dN * (4\sigma^2 \pi a) \quad (6)$$

In practice gross strain may not be known. A surrogate value, such as torque or generator power, may be used.

Using the UKF, D may be estimated directly, i.e., without calculation of da/dN (or dHI/dt). With an estimate of D, a state propagation of HI is:
$HI_{t|t-1} = \exp(D(4\sigma^2 \pi) + \ln(HI_{t-1|t-1}))$, for 1 step ahead in time, assuming a HI of 1 corresponds to the point at which maintenance is performed.

Accordingly, the UKF in matrix form, includes a state vector X defined as:

$$X = \begin{bmatrix} HI \\ D \\ RUL \\ dRUL/dt \\ d^2RUL/dt^2 \end{bmatrix}$$

and a state transition function $X_t$ defined as:

$$X_t = \begin{bmatrix} \exp\begin{pmatrix} D(4\sigma^2\pi)+ \\ \ln(HI_{t-1|t-1}) \end{pmatrix} \\ (H_t - H_{t-1})(4\sigma^2\pi HI_{t-1}) \\ N+dN+d^2N/2 \\ dH+d^2N \\ d^2N \end{bmatrix}$$

The UKF is a recursive algorithm that is configured to determine:

$X_t = f(X_{t-1})$ (the state update based on the state transition function $X_t$), $P_{t|t-1} = f(X)P_{t-1|t-1}f(X)' + Q$ (Covariance), $K = P_{t|t-1}H(X)'[H(X)P_{t|t-1}H(X)' + R]^{-1}$ (Gain), $P_{t|t} = (I-KC)P_{t|t-1}$ (State Covariance), and $X_{t|t} = X_{t|t-1}K(Y-H(X_{t|t-1}))$ (State Update), where Y is the measured data, in this case the next HI value,
K is the Kalman Gain,
P is the state covariance matrix,
Q is the process noise model,
H is the measurement function, essentially 1 for HI, and zeros for all other states, and
R is the measurement variance.

Thus, for each new acquisition, the state X is updated.

The first and second derivatives of RUL may be calculated to test the model validity: when dRUL/dt=−1 one cycle of component life is consumed with each hour of usage. When the second derivative is near zero, this suggest a valid estimation of the RUL.

All methods (KF, EKF, UKF and PF) need an estimate of system noise. This may be calculated in real time using a recursive estimator:

$\sigma_t^2 = (1-a)\sigma_{t-1}^2 + (CE[X_{t|t-1}|Y_{t-1}]-Y)^2$

Using a Butterworth filter design and a normalized bandwidth of 0.1, a is given as 0.2677. The recursive estimator corresponds to an infinite impulse response (IIR) filter. IIR filters include Butterworth, Chebychev and Elliptic. A characteristic of the Butterworth filter is that it is generally maximally flat below the pass band.

A RUL bound may be generated by using by the state covariance and range on strain. An upper bound (e.g. shortest RUL) is:

$k = E[\sigma] + 1.64\sqrt{V[\sigma]}$ $a_{o+} = a_o + 1.64\text{chol}(P)$ $a_f = \exp(ND(4k^2\pi) + \ln(a_{o+}))$ Taking the chol (Cholesky decomposition of covariance P) effectively provides the standard deviation of the system. The variance and mean value of the load (σ) may also be estimated. Multiplying by 1.64 provides a 95% (upper bound) on RUL, Similarly, by changing the sign of argument:

$k = E[\sigma] - 3\sqrt{V[\sigma]}$ $a_{o+} = a_o - 3\text{chol}(P)$ $a_f = \exp(ND(4k^2\pi) + \ln(a_{o+}))$ A 5% lower bound (longest RUL) of the component may then be calculated. This may provide insight into how to best balance the risk of running the machine vs. load.

The UKF may have lower noise (half) compared to EKE. The UKF methodology may be considerably faster than the PF (typically 100×). The UKF methodology coupled with the use of dRUL/dt and $d^2$RUL/$dt^2$ may provide a bound on error. A bound on the RUL estimate may provide a user/operator better information on how to plan maintenance. Real time (on-line) estimate of measurement noise may improve performance or RUL.

Accordingly, the Unscented Kalman filter (UKF) may be used to estimate the RUL. Estimates of two additional states in the UKF (the first and second derivate of the RUL) may be used to validate model performance. Process noise may be estimated using an online method which results in a better estimate of RUL. The forecast of future health (RUL) may be bounded based on system covariance and the distribution of load.

Figure 15:
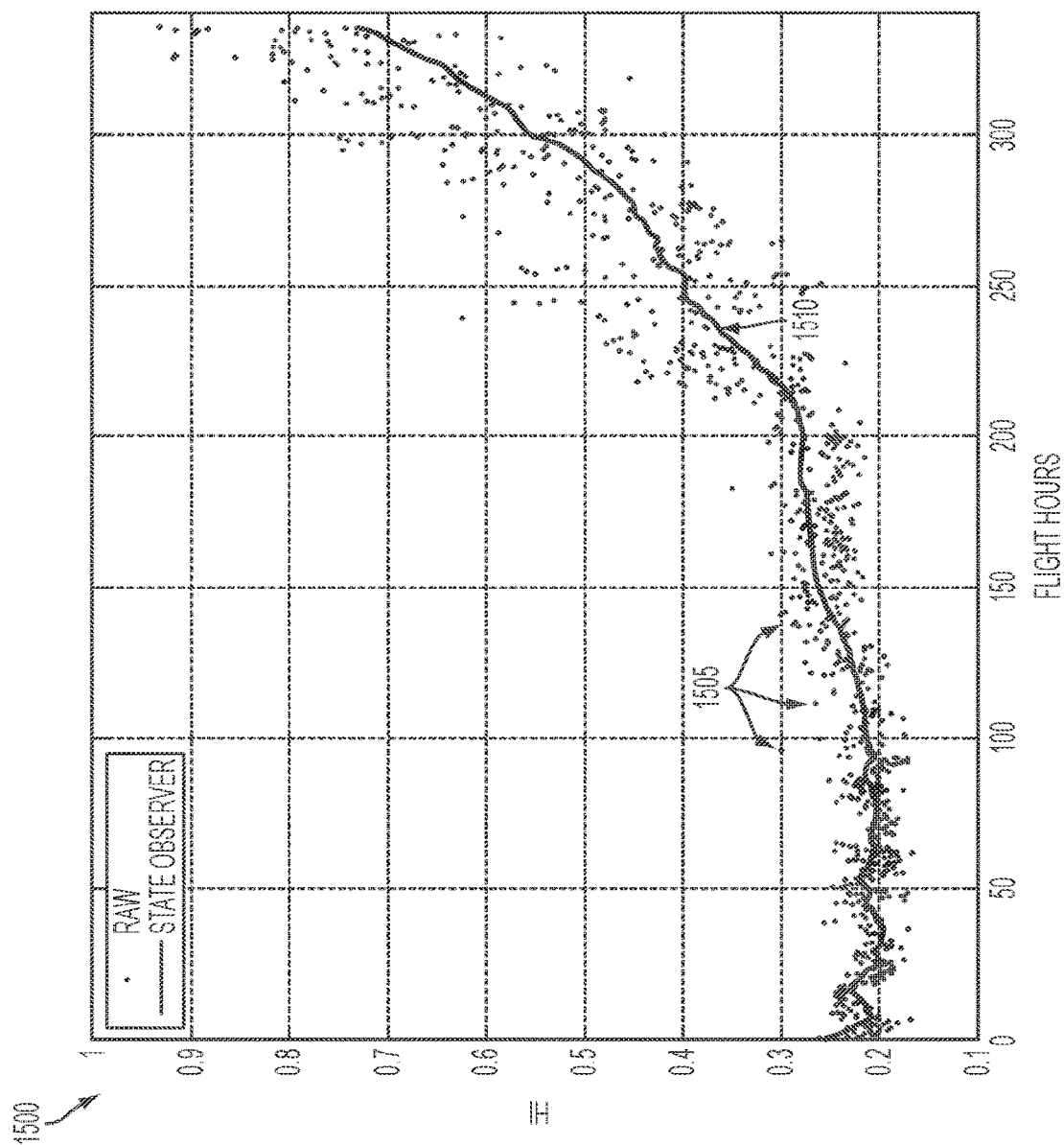
FIG. 15 is a plot of actual and estimated values of a health indicator for a rotating machine example consistent with the present disclosure.
Figure 16:
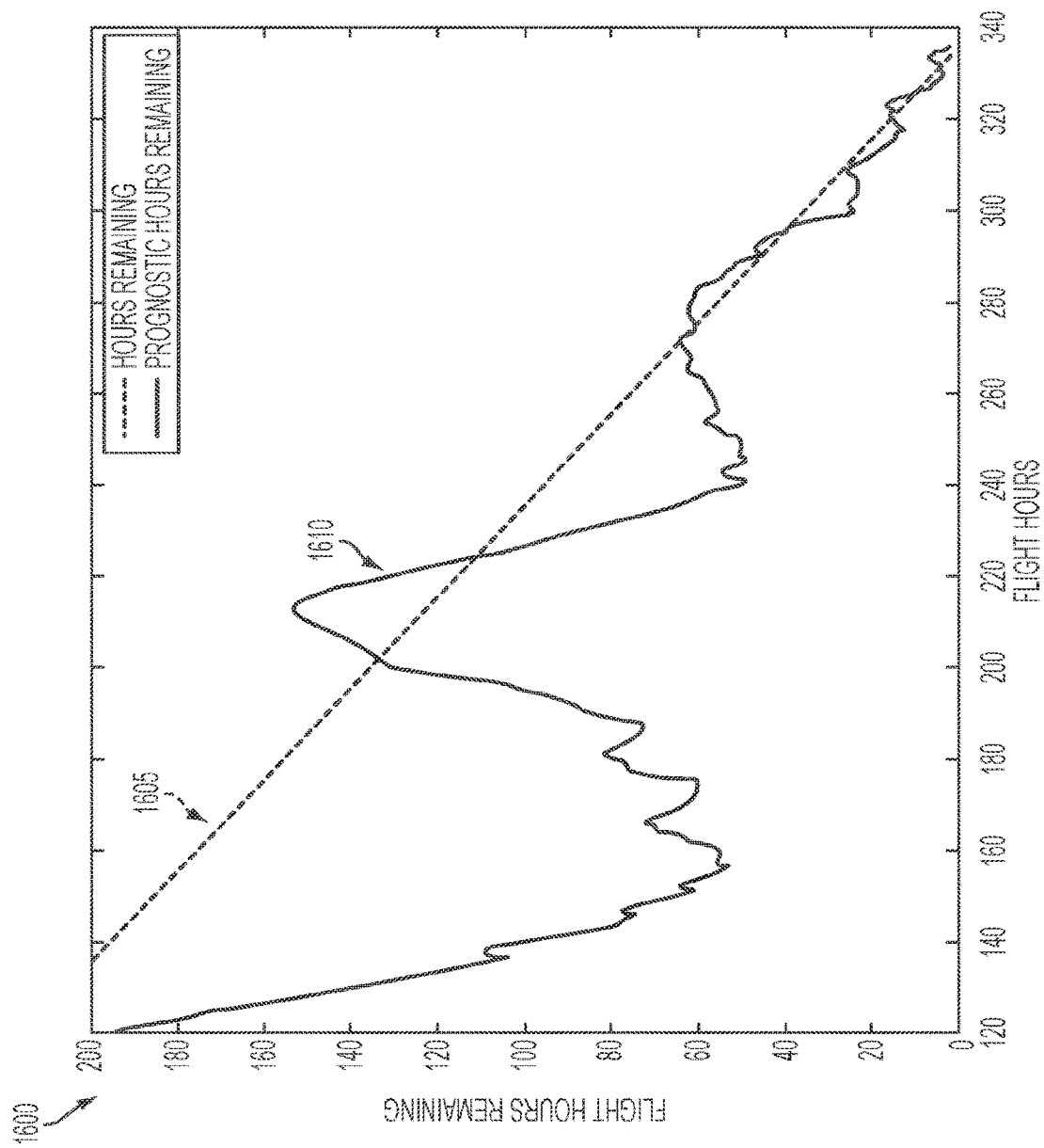
FIG. 16 is a plot of actual and prognostic remaining useful life of the rotating machine example of FIG. 15 consistent with the present disclosure.
Figure 17:
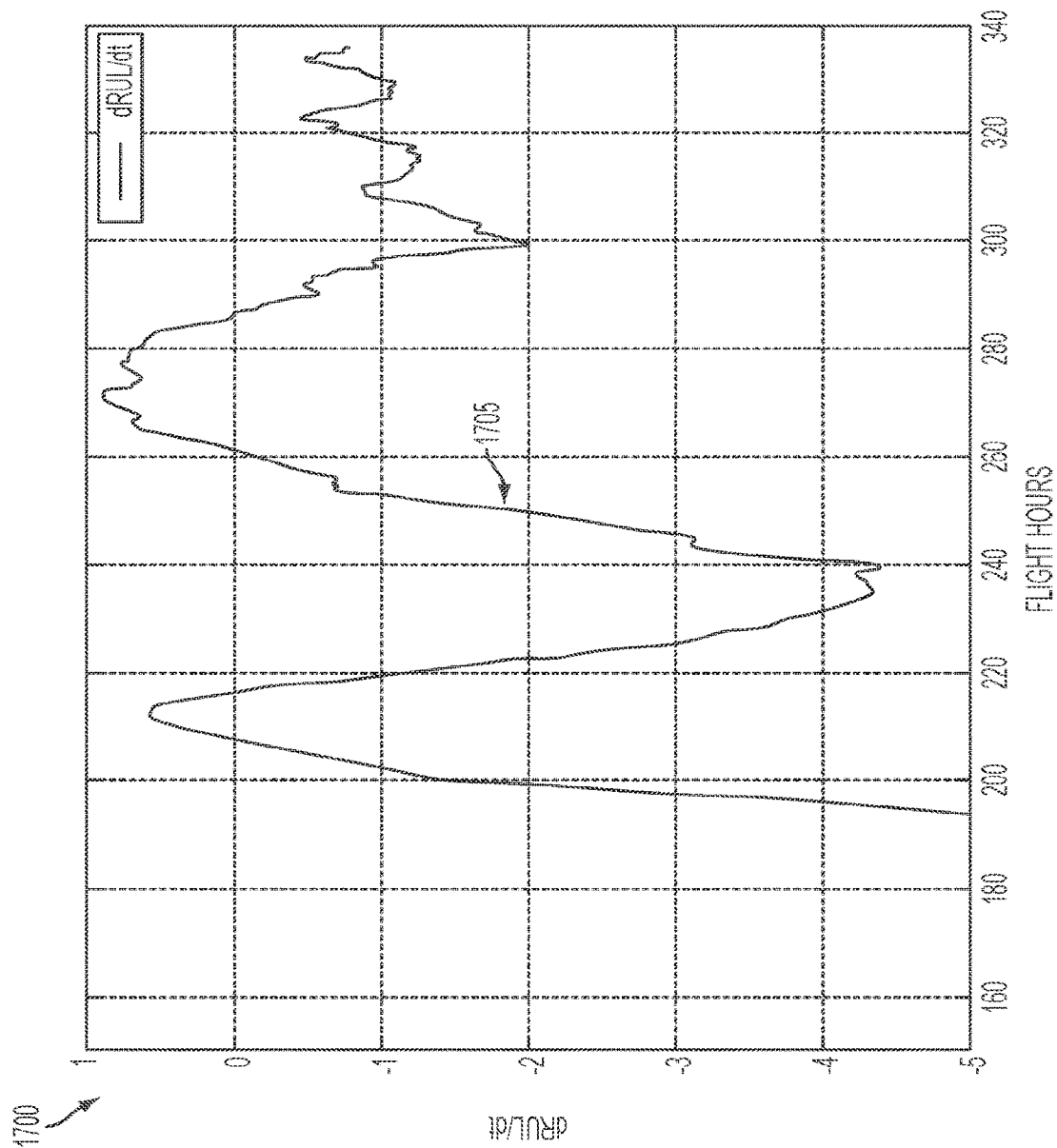
FIG. 17 is a plot of a first derivative of the prognostic remaining useful life of the rotating machine example of FIG. 15 consistent with the present disclosure.

FIGS. 15 through 17 are plots 1500, 1600, 1700, respectively, illustrating a health indicator, remaining useful life and a first derivative of remaining useful life, respectively, as a function of flight hours (i.e., usage time) for a rotating machine example (i.e., a component of the rotating machine). In this example, the rotating machine is a helicopter, the component is a shaft and the health indicator (HI) corresponds to condition indicator shaft order 1. A limit, i.e., threshold, for shaft order 1 was set at 0.75 inches per second (ips), corresponding to a stiff mounting block and medium size equipment, as defined in international Organization for Standardization Standard ISO 10816-3:2009, "Mechanical vibration—Evaluation of machine vibration by measurements on non-rotating parts—Part 3: Industrial machines with nominal power above 15 kW and nominal speeds between 120 r/min and 15 000 r/min when measured in situ."

Turning to FIG. 15, there is illustrated a distribution of experimental data 1505 for a health indicator (HI) for a number of samples of equipment (shafts) for a time period (usage period) of zero to 350 flight hours. There is also illustrated an estimate 1510 of the HI determined using the unscented Kalman filter described herein. This plot 1500 shows that the distribution 1505 and estimate 1510 of the HI begin to increase relatively more significantly between about 200 and 250 flight hours. The estimate 1510 of the HI appears to track the experimental data.

Turning to FIG. 16, there is illustrated an estimate 1610 of hours remaining, "prognostic hours remaining" (RUL) and an actual 1605 hours remaining. The actual 1605 hours remaining is a straight line with slope−1. In other words, for each hour of usage, one less hour remains in the life of the component shaft. The prognostic 1610 hours remaining do not appear to converge to the actual 1605 hours remaining until about 260 flight hours.

Turning to FIG. 17, there is illustrated a first derivative 1705 of the prognostic hours remaining illustrated in FIG. 16. The prognostic hours remaining may be considered "good" (i.e., valid) when the prognostic and its first derivative have converged and the derivative is near −1. The derivative of −1 corresponds to the slope of the actual hours remaining, i.e., for each hour the machine is used, its remaining life is reduced by one hour. Accordingly, the prognostic hours remaining may be considered "good" at greater than or equal to 300 flight hours.

Figure 18:
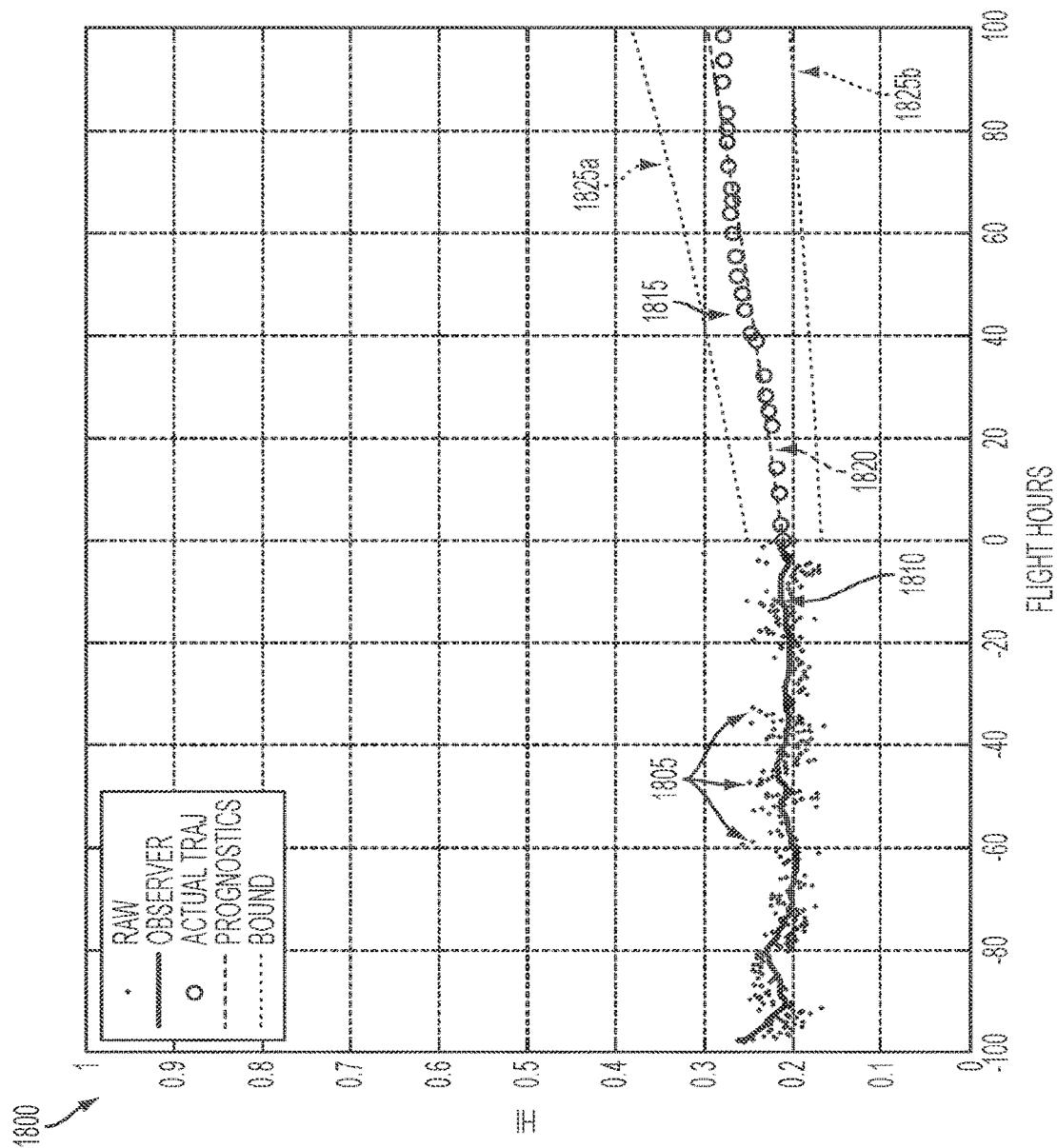
FIG. 18 is a plot of data displayed to a user for the rotating machine example of FIG. 15 consistent with the present disclosure.
Figure 19:
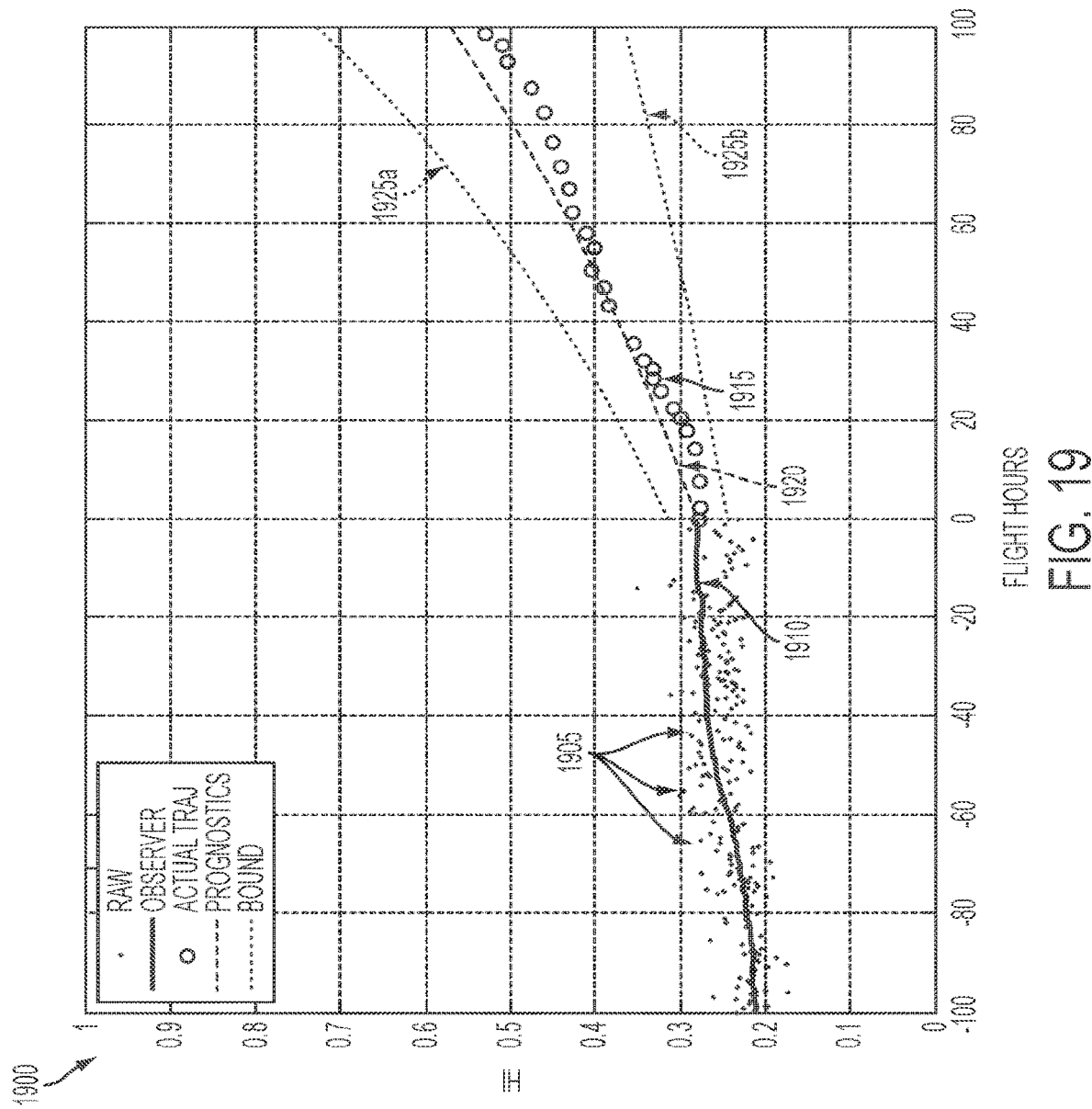
FIG. 19 is a plot of data displayed to a user for another rotating machine example consistent with the present disclosure.
Figure 20:
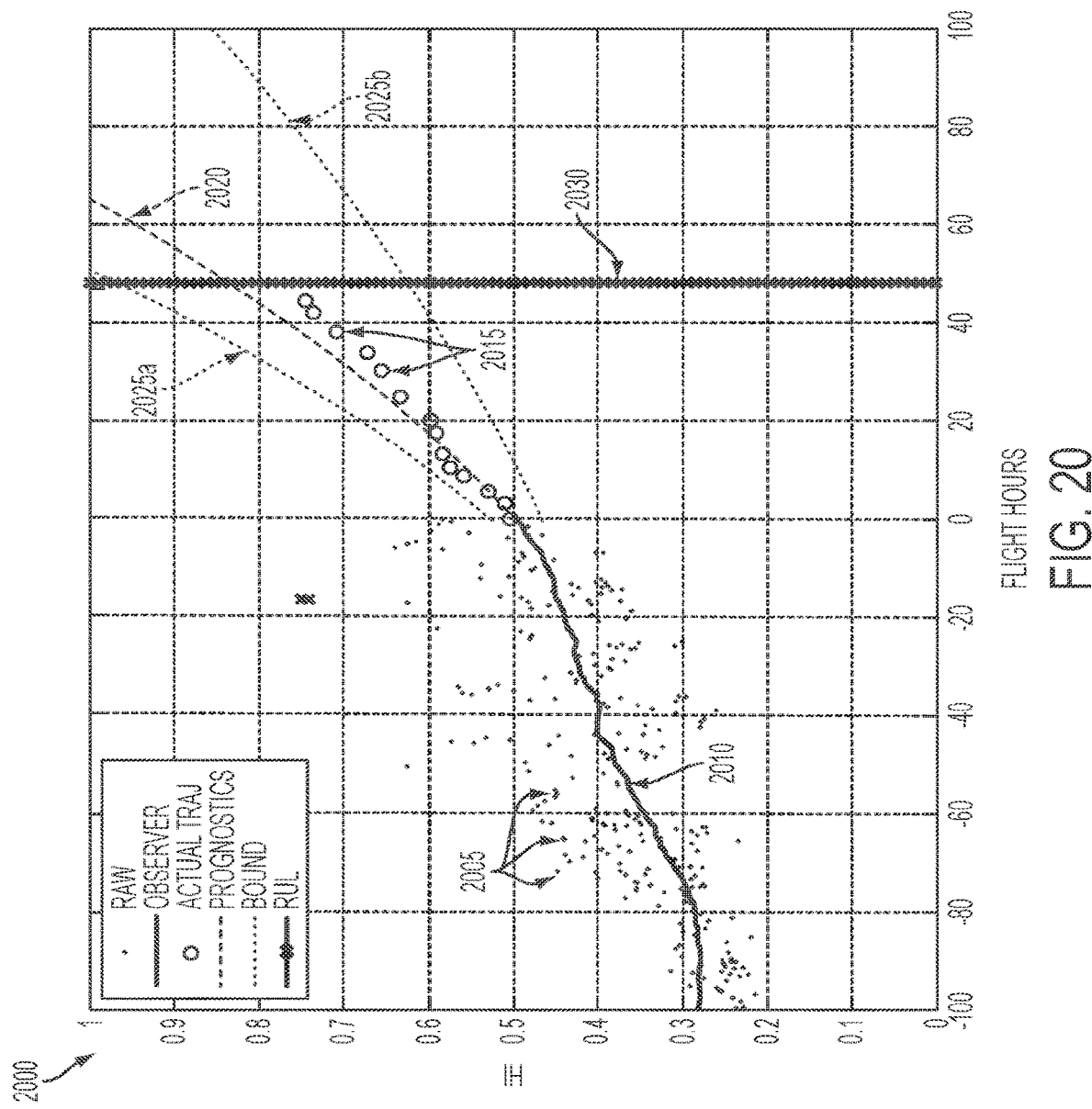
FIG. 20 is a plot of data displayed to a user for yet another rotating machine example, highlighting time to maintenance consistent with the present disclosure.

FIGS. 18 through 20 are plots 1800, 1900, 2000, respectively, illustrating a display to a user of a health indicator for a Current state (0 flight hours), with historical data (i.e., negative time) and prognostic data (i.e., positive time), for the example of FIG. 15. For each plot 1800, 1900, 2000, historical data includes experimental data 1805, 1905, 2005 for the health indicator of the monitored component and an estimate 1810, 1910, 2010 of the health indicator using, e.g., the unscented Kalman filter. Prognostic data includes a predicted (i.e., prognostic) 1820, 1920, 2020 health indicator for 100 hours into the future, as well as bounds 1825a, 1925a, 2025a, 1825b, 1925b 2025b on the predicted health indicator. Although not available for user display at time 0 flight hours, each plot 1800, 1900, 2000 includes an actual trajectory 1815, 1915, 2015 that corresponds to the actual health indicator for the time period after the "current time" of zero flight hours. The actual trajectories are included to provide an indication of the accuracy of the prognostic health indicator.

Plot 1800 illustrates a relatively long time to failure of a monitored component, i.e., a relatively small slope of the prognostic 1820 health indicator. Plot 1900 illustrates a relatively moderate time to failure of a monitored component, i.e., a relatively moderate slope of the prognostic 1920 health indicator. Plot 2000 illustrates a relatively short time to failure of a monitored component, i.e., a relatively steep slope of the prognostic 2020 health indicator.

Plot 2000 further includes a remaining useful life (RUL) indicator 2030. For example, at the current time of 0 flight hours, the remaining useful life is about 50 hours corresponding to a time that maintenance should be performed. As illustrated in plot 2000, time to do maintenance may be predicted based on historical, statistical and/or prognostic data.

Accordingly, using techniques consistent with the present disclosure, a predicted time for maintenance of a monitored may be estimated based, at least in part, on historical and/or statistical data associated with the component and current detected component parameter(s). The predicted time for maintenance may be provided (i.e., displayed) to a user graphically. The display may include the historical data, the prognostic data and a suggested time for maintenance, as described herein. In this manner, maintenance may be planned for in advance, may be performed when necessary, and replacing good components or waiting until failure may be avoided.

Generally, a system and method consistent with the present disclosure are configured to provide a relatively low cost, relatively robust data acquisition and analysis system useful for condition-based maintenance. The system may be useful for condition-based maintenance in industrial applications, e.g., of equipment and/or machinery. The industrial monitoring system may be used, for example, to monitor a condition of rotating machinery, e.g., a wind turbine. The system and method may include data analysis useful for anticipating a need for maintenance, repair and/or replacement of one or more components. One or more parameters associated with a condition of a component may be detected. Condition Indicators and/or Health Indicators may be determined based, at least in part, on acquired sensor output data. The Condition Indicators and/or Health Indicators are configured to provide an indication when a component may be no longer good so that maintenance and/or repair can be planned for and scheduled. For example, using vibration and/or usage data, the condition of a component, e.g., a shaft, gear and/or bearing may be determined. Based on the condition of the component, a remaining useful life ("RUL") may then be determined. Statistical data and/or physical limits may be used to determine a current equipment state. The remaining useful life may be determined using, e.g., physics of failure models and/or usage and/or statistical data. For example, the system and/or method may be useful for condition-based maintenance of wind turbines in a wind farm, as described herein.

According to one aspect of the present disclosure, there is provided a data acquisition system for monitoring one or more components of rotating machinery. The data acquisition system includes a plurality of separate sensor modules, each of the plurality of separate sensor modules is associated with one of a plurality of separate components of rotating machinery and configured to detect a parameter associated with a condition of at least the separate respective component and to generate data includes a representation of the condition of at least the separate respective component based, at least in part, on the detected parameter. The data acquisition system further includes a data bus configured to couple each of the plurality of separate sensor modules to a server, wherein the server is configured to provide an estimate of remaining useful life of a selected one of the separate respective components of the rotating machinery to a user based, at least in part, on a representation of a condition of the selected one of the separate respective components.

According to another aspect of the present disclosure, there is provided a system. The system includes rotating machinery and a data acquisition system mounted on the rotating machinery and configured to monitor one or more components of the rotating machinery. The data acquisition system includes a plurality of separate sensor modules, each of the plurality of separate sensor modules is associated with one of a plurality of separate components of the rotating machinery and configured to detect a parameter associated with a condition of at least the separate respective component and to generate data includes a representation of the condition of at least the separate respective component based, at least in part, on the detected parameter. The data acquisition system further includes a data bus configured to couple each of the plurality of separate sensor modules to a server, wherein the server is configured to provide an estimate of remaining useful life of a selected one of the separate respective components of the rotating machinery to a user based, at least in part, on a representation of a condition of the selected one of the separate respective components. The data acquisition further includes a local data concentrator coupled to each of the plurality of separate sensor modules and configured to provide media access control (MAC) for to at least one of the separate sensor modules, to transmit commands to at least one of the separate sensor modules, to receive data from at least one of the separate sensor modules and to provide received data to the server via the data bus.

According to yet another aspect of the present disclosure, there is provided a method of determining an estimate of a remaining useful life of a monitored component of rotating machinery. The method includes providing a data acquisition system mounted on rotating machinery. The data acquisition system includes a plurality of separate sensor modules, each of the plurality of separate sensor modules is associated with one of a plurality of separate components of the rotating machinery. The method further includes detecting a parameter associated with a condition of a selected one of at selected one of the plurality of separate components or a component indirectly coupled thereto and generating sensor output data based, at least in part, on the parameter. The method further includes analyzing the sensor output data, generating module output data includes a representation of the condition of the selected one of the plurality of separate components or the component indirectly coupled thereto based, at least in part, on the sensor output data, transmitting the output data to a server and estimating remaining useful life of the selected one of the plurality of components or the component indirectly coupled thereto based, at least in part, on a representation of a condition of the selected one of the plurality of components or the component indirectly coupled thereto.

While the principles of the invention have been described herein, it is to be understood by those skilled in the art that this description is made only by way of example and not as a limitation as to the scope of the invention. The features and aspects described with reference to particular embodiments disclosed herein are susceptible to combination and/or application with various other embodiments described herein. Such combinations and/or applications of such described features and aspects to such other embodiments are contemplated herein. Other embodiments are contemplated within the scope of the present invention in addition to the exemplary embodiments shown and described herein. Modifications and substitutions by one of ordinary skill in the art are considered to be within the scope of the present invention.

The invention claimed is:

1. A data acquisition system for monitoring one or more components of a machine having a plurality of separate components, the data acquisition system comprising:
a plurality of separate sensor modules, each of the plurality of separate sensor modules being associated with a separate respective component of the plurality of separate components of the machine, each of the plurality of separate components of the machine having a useful life, and including:
a sensor, configured to:
detect a parameter of the separate respective component; and
to provide sensor data based on the detected parameter; and
an interface module coupled to the sensor and configured to:
receive the sensor data from the sensor; and
generate module output data based on the received sensor data, the module output data comprising a representation of a condition of the separate respective component based on the received sensor data;
a server; and
a data bus, configured to:
couple the plurality of separate sensor modules to the server; and
allow transmission of the module output data from each of the plurality of separate sensor modules to the server;
wherein the server is configured to provide a time estimate of remaining useful life of at least one of the separate respective components of the machine at various points throughout the useful life of the at least one of the separate respective components of the machine.

2. The data acquisition system of claim 1, wherein:
the data bus is a daisy chain; and
each of the plurality of separate sensor modules is connected to at most two other sensor modules.

3. The data acquisition system of claim 1, further comprising:
a local data concentrator coupled to each of the plurality of separate sensor modules and configured to provide media access control (MAC) for at least one of the separate sensor modules, to transmit commands to at least one of the separate sensor modules, to receive data from at least one of the separate sensor modules, and to provide received data to the server via the data bus.

4. The data acquisition system of claim 3,
wherein the data bus is configured to carry power from the local data concentrator to at least one of the separate sensor modules.

5. The data acquisition system of claim 1,
wherein the sensor comprises a tachometer configured to detect a rotational speed of a separate respective component or a component indirectly coupled thereto.

6. The data acquisition system of claim 1,
wherein the sensor comprises an accelerometer configured to detect vibration of a separate respective component or a component indirectly coupled thereto.

7. The data acquisition system of claim 1,
wherein the separate respective component is a shaft, a bearing, or a gear.

8. The data acquisition system of claim 1,
wherein at least one of the plurality of separate sensor modules comprises a controller configured to perform floating point calculations in hardware.

9. A system comprising:
a rotating machine; and
a data acquisition system mounted on the rotating machine and configured to monitor components of the rotating machine, the data acquisition system comprising:
a plurality of separate sensor modules, each of the plurality of separate sensor modules being associated with one of a plurality of separate respective components of the rotating machine, each of the plurality of separate components of the machine having a useful life, and including:
a sensor configured to detect a parameter associated with a condition of the separate respective component and to provide sensor data based on the detected parameter; and
an interface module directly coupled to the sensor and configured to receive the sensor data from the sensor and to generate module output data based on the received sensor data;
a server; and
a data bus configured to:
couple each of the plurality of separate sensor modules to the server; and
allow transmission of module output data from each of the plurality of separate sensor modules to the server;
wherein the server is configured to provide a time estimate of remaining useful life of a selected one of the separate respective components of the rotating machine to a user based on the module output data at various points throughout the useful life of the at least one of the separate respective components of the machine.

10. The system of claim 9,
wherein the module output data comprises a representation of the condition of the separate respective component.

11. The system of claim 9, further comprising:
a local data concentrator coupled to each of the plurality of separate sensor modules and configured to provide media access control (MAC) for at least one of the separate sensor modules, to transmit commands to at least one of the separate sensor modules, to receive data from at least one of the separate sensor modules, and to provide received data to the server via the data bus.

12. The system of claim 9, wherein the sensor is a tachometer configured to detect a rotational speed of a separate respective component or a component indirectly coupled thereto.

13. The system of claim 9, wherein the sensor is an accelerometer configured to detect vibration of a separate respective component or a component indirectly coupled thereto.

14. The system of claim 9, wherein the separate respective component is a shaft, a bearing, or a gear.

15. The system of claim 9, wherein the rotating machine is one of a wind turbine, a gas turbine, and a gearbox associated with ground vehicles, ships and/or aircraft.

* * * * *